US009447204B2

(12) United States Patent
Yang et al.

(10) Patent No.: US 9,447,204 B2
(45) Date of Patent: *Sep. 20, 2016

(54) METHODS FOR TERMINATING OLEFIN POLYMERIZATIONS

(71) Applicant: Chevron Phillips Chemical Company LP, The Woodlands, TX (US)

(72) Inventors: Qing Yang, Bartlesville, OK (US); Max P. McDaniel, Bartlesville, OK (US); Tony R. Crain, Niotaze, KS (US); Kathy S. Clear, Bartlesville, OK (US)

(73) Assignee: Chevron Phillips Chemical Company LP, The Woodlands, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 14/566,740

(22) Filed: Dec. 11, 2014

(65) Prior Publication Data

US 2015/0137034 A1    May 21, 2015

Related U.S. Application Data

(63) Continuation of application No. 13/864,306, filed on Apr. 17, 2013, now Pat. No. 8,940,844, which is a continuation of application No. 13/096,142, filed on Apr. 28, 2011, now Pat. No. 8,440,772.

(51) Int. Cl.
| | |
|---|---|
| *C08F 2/00* | (2006.01) |
| *C08F 4/00* | (2006.01) |
| *C08F 6/02* | (2006.01) |
| *C08F 2/42* | (2006.01) |
| *C09K 15/06* | (2006.01) |
| *C08F 110/02* | (2006.01) |

(52) U.S. Cl.
CPC . *C08F 6/02* (2013.01); *C08F 2/42* (2013.01); *C09K 15/06* (2013.01); *C08F 110/02* (2013.01); *C08F 2400/02* (2013.01)

(58) Field of Classification Search
CPC .......... C08F 2/42; C08F 6/02; C08F 110/02; C08F 2400/02; C09K 15/06
USPC ............................... 526/209, 217, 220, 234
See application file for complete search history.

(56) References Cited

U.S. PATENT DOCUMENTS

| | | | |
|---|---|---|---|
| 2,825,721 A | 3/1958 | Hogan et al. | |
| 3,119,569 A | 1/1964 | Baricordi | |
| 3,138,645 A * | 6/1964 | Hutchings | C10G 29/205 208/138 |

(Continued)

FOREIGN PATENT DOCUMENTS

| | | |
|---|---|---|
| WO | WO 2004/082827 | 9/2004 |
| WO | WO 2011/103280 | 8/2011 |

OTHER PUBLICATIONS

Bomgardner, article entitled "Replacing Trans Fat", published Mar. 12, 2012 at www.cen-online.org, pp. 30-32.

(Continued)

*Primary Examiner* — William Cheung
(74) *Attorney, Agent, or Firm* — Merchant & Gould P.C.

(57) ABSTRACT

Catalyst deactivating agents and compositions containing catalyst deactivating agents are disclosed. These catalyst deactivating agents can be used in methods of controlling polymerization reactions, methods of terminating polymerization reactions, methods of operating polymerization reactors, and methods of transitioning between catalyst systems.

9 Claims, 8 Drawing Sheets

(56) References Cited

U.S. PATENT DOCUMENTS

| | | |
|---|---|---|
| 3,177,184 A | 4/1965 | Cottle |
| 3,225,023 A | 12/1965 | Hogal et al. |
| 3,226,205 A | 12/1965 | Rohlfing |
| 3,242,099 A | 3/1966 | Manyik |
| 3,248,179 A | 4/1966 | Norwood |
| 3,269,997 A | 8/1966 | Lyons et al. |
| 3,622,521 A | 11/1971 | Hogan et al. |
| 3,625,864 A | 12/1971 | Horvath |
| 3,708,465 A | 1/1973 | Dietrich et al. |
| 3,798,465 A | 3/1974 | Guth |
| 3,887,494 A | 6/1975 | Dietz |
| 3,900,457 A | 8/1975 | Witt |
| 3,976,632 A | 8/1976 | DeLap |
| 4,053,436 A | 10/1977 | Hogan et al. |
| 4,081,407 A | 3/1978 | Short et al. |
| 4,151,122 A | 4/1979 | McDaniel et al. |
| 4,182,815 A | 1/1980 | McDaniel et al. |
| 4,211,863 A | 7/1980 | McDaniel et al. |
| 4,247,421 A | 1/1981 | McDaniel et al. |
| 4,248,735 A | 2/1981 | McDaniel et al. |
| 4,296,001 A | 10/1981 | Hawley |
| 4,297,460 A | 10/1981 | McDaniel et al. |
| 4,301,034 A | 11/1981 | McDaniel |
| 4,306,044 A | 12/1981 | Charsley |
| 4,326,048 A | 4/1982 | Stevens et al. |
| 4,339,559 A | 7/1982 | McDaniel |
| 4,364,842 A | 12/1982 | McDaniel et al. |
| 4,364,854 A | 12/1982 | McDaniel et al. |
| 4,364,855 A | 12/1982 | McDaniel et al. |
| 4,392,990 A | 7/1983 | Witt |
| 4,397,766 A | 8/1983 | Hawley et al. |
| 4,397,769 A | 8/1983 | McDaniel et al. |
| 4,405,501 A | 9/1983 | Witt |
| 4,444,962 A | 4/1984 | McDaniel et al. |
| 4,444,964 A | 4/1984 | McDaniel et al. |
| 4,444,965 A | 4/1984 | McDaniels et al. |
| 4,460,756 A | 7/1984 | McDaniel et al. |
| 4,501,885 A | 2/1985 | Sherk et al. |
| 4,504,638 A | 3/1985 | McDaniel et al. |
| 4,547,555 A | 10/1985 | Cook et al. |
| 4,547,557 A | 10/1985 | McDaniel |
| 4,588,790 A | 5/1986 | Jenkins |
| 4,634,744 A | 1/1987 | Hwang et al. |
| 4,666,999 A | 5/1987 | Cook et al. |
| 4,735,931 A | 4/1988 | McDaniel et al. |
| 4,786,717 A | 11/1988 | Bretches et al. |
| 4,806,513 A | 2/1989 | McDaniel et al. |
| 4,808,561 A | 2/1989 | Welborn |
| 4,820,785 A | 4/1989 | McDaniel et al. |
| 4,834,947 A | 5/1989 | Cook et al. |
| 4,855,271 A | 8/1989 | McDaniel et al. |
| 4,939,217 A | 7/1990 | Stricklen |
| 4,981,831 A | 1/1991 | Knudsen et al. |
| 4,988,657 A | 1/1991 | Martin et al. |
| 5,026,885 A | 6/1991 | Bell et al. |
| 5,037,911 A | 8/1991 | McDaniel et al. |
| 5,179,178 A | 1/1993 | Stacy et al. |
| 5,191,132 A | 3/1993 | Patsidis et al. |
| 5,210,352 A | 5/1993 | Alt et al. |
| 5,219,817 A | 6/1993 | McDaniel et al. |
| 5,221,654 A | 6/1993 | McDaniel et al. |
| 5,237,025 A | 8/1993 | Benham et al. |
| 5,244,990 A | 9/1993 | Mitchell |
| 5,270,408 A | 12/1993 | Craddock, III et al. |
| 5,275,992 A | 1/1994 | Mitchell et al. |
| 5,331,086 A | 7/1994 | Stricklen et al. |
| 5,347,026 A | 9/1994 | Patsidis et al. |
| 5,352,749 A | 10/1994 | DeChellis |
| 5,399,320 A | 3/1995 | Craddock, III et al. |
| 5,399,636 A | 3/1995 | Alt et al. |
| 5,401,817 A | 3/1995 | Palackal et al. |
| 5,420,320 A | 5/1995 | Zenk et al. |
| 5,436,304 A | 7/1995 | Griffin |
| 5,436,305 A | 7/1995 | Alt et al. |
| 5,451,649 A | 9/1995 | Zenk et al. |
| 5,455,314 A | 10/1995 | Burns |
| 5,480,848 A | 1/1996 | Geerts |
| 5,496,781 A | 3/1996 | Geerts et al. |
| 5,498,581 A | 3/1996 | Welch et al. |
| 5,541,272 A | 7/1996 | Schmid et al. |
| 5,541,649 A | 7/1996 | Yamamoto et al. |
| 5,543,479 A | 8/1996 | Baade et al. |
| 5,554,795 A | 9/1996 | Frey et al. |
| 5,563,284 A | 10/1996 | Frey et al. |
| 5,565,175 A | 10/1996 | Hottovy |
| 5,565,592 A | 10/1996 | Patsidis et al. |
| 5,571,880 A | 11/1996 | Alt et al. |
| 5,575,979 A | 11/1996 | Hanson |
| 5,594,078 A | 1/1997 | Welch et al. |
| 5,610,247 A | 3/1997 | Alt et al. |
| 5,627,247 A | 5/1997 | Alt et al. |
| 5,631,203 A | 5/1997 | Welch et al. |
| 5,631,335 A | 5/1997 | Alt et al. |
| 5,654,454 A | 8/1997 | Peifer et al. |
| 5,668,230 A | 9/1997 | Schertl et al. |
| 5,705,478 A | 1/1998 | Boime |
| 5,705,579 A | 1/1998 | Hawley et al. |
| 6,239,235 B1 | 5/2001 | Hottovy |
| 6,262,191 B1 | 7/2001 | Hottovy |
| 6,300,271 B1 | 10/2001 | McDaniel |
| 6,355,594 B1 | 3/2002 | McDaniel |
| 6,365,681 B1 | 4/2002 | Hartley et al. |
| 6,395,666 B1 | 5/2002 | McDaniel |
| 6,403,735 B1* | 6/2002 | Becke .................... C07F 17/00 502/102 |
| 6,548,442 B1 | 4/2003 | McDaniel |
| 6,559,247 B2 | 5/2003 | Kufeld et al. |
| 6,613,712 B1 | 9/2003 | McDaniel |
| 6,653,416 B2 | 11/2003 | McDaniel et al. |
| 6,825,292 B2 | 11/2004 | Reid |
| 6,831,141 B2 | 12/2004 | McDaniel et al. |
| 6,833,338 B2 | 12/2004 | McDaniel et al. |
| 6,833,415 B2 | 12/2004 | Kendrick |
| 6,838,531 B2 | 1/2005 | Reid et al. |
| 7,005,485 B2 | 2/2006 | Burns et al. |
| 7,294,599 B2 | 11/2007 | Jensen et al. |
| 7,312,283 B2 | 12/2007 | Martin et al. |
| 7,381,777 B1 | 6/2008 | Towles et al. |
| 7,417,097 B2 | 8/2008 | Yu et al. |
| 7,446,167 B2 | 11/2008 | Blackmon et al. |
| 8,440,772 B2 | 5/2013 | Yang et al. |
| 8,940,844 B2 | 1/2015 | Yang et al. |
| 2003/0181613 A1 | 9/2003 | Lele et al. |
| 2004/0091419 A1 | 5/2004 | Ogihara et al. |
| 2004/0151642 A1 | 8/2004 | Burns et al. |
| 2004/0230031 A1 | 11/2004 | Hottovy et al. |
| 2004/0253151 A1 | 12/2004 | Nguyen et al. |
| 2010/0154146 A1* | 6/2010 | Shah ....................... B41M 7/00 8/552 |
| 2012/0277385 A1 | 11/2012 | Yang et al. |
| 2013/0228723 A1 | 9/2013 | Yang et al. |
| 2013/0345373 A1 | 12/2013 | McDaniel et al. |

OTHER PUBLICATIONS

*Dow Corning*® 702, 704 and 705 Diffusion Pump Fluid, Product Information, Dow Corning Corporation (1998), 4 pages.

\* cited by examiner

METHODS FOR TERMINATING OLEFIN POLYMERIZATIONS

REFERENCE TO RELATED APPLICATIONS

This application is a continuation application of U.S. patent application Ser. No. 13/864,306, filed on Apr. 17, 2013, now U.S. Pat. No. 8,940,844, which is a continuation application of U.S. patent application Ser. No. 13/096,142, filed on Apr. 28, 2011, now U.S. Pat. No. 8,440,772, which are incorporated herein by reference in their entirety.

BACKGROUND OF THE INVENTION

There are various methods and materials that can be employed to terminate a polymerization reaction. For example, injections of large amounts of water or isopropanol into a polymerization reactor or downstream of the reactor can be used to terminate the polymerization reaction. However, these methods and materials often can lead to excessive cost, clean-up, and/or downtime.

It would be beneficial to develop new methods and materials that can effectively terminate a polymerization reaction, either for rapid termination in the polymerization reactor due to a process upset, or for neutralization of catalyst reactivity downstream of the reactor during normal polymer production, yet reduce the associated cost, clean-up, and downtime. Accordingly, it is to these ends that the present disclosure is directed.

SUMMARY OF THE INVENTION

Methods of controlling a polymerization reaction in a polymerization reactor system are disclosed herein. One such method can comprise introducing a catalyst deactivating agent into the polymerization reactor system to partially or completely terminate the polymerization reaction. The catalyst deactivating agent can be introduced into a polymerization reactor within the polymerization reactor system, and/or the catalyst deactivating agent can be introduced downstream of the polymerization reactor. Consistent with embodiments disclosed herein, the catalyst deactivating agent can comprise a polyethylene glycol, a polypropylene glycol, a compound having formula (I), or a combination thereof, wherein formula (I) is:

$$R^1-X^1-R^3-X^2-R^2 \quad (I).$$

In formula (I),
$X^1$ and $X^2$ independently can be O, S, or NR, wherein R can be hydrogen or a $C_1$ to $C_{18}$ hydrocarbyl group;
$R^1$ and $R^2$ independently can be hydrogen or a $C_1$ to $C_{18}$ hydrocarbyl group; and
$R^3$ can comprise up to 18 carbon atoms and can be
(i) a substituted or unsubstituted chain of at least two contiguous carbons atoms, one end of which is bonded to $X^1$ and the other end of which is bonded to $X^2$, or
(ii) a substituted or unsubstituted ether, thioether, or amine group having at least four carbon atoms, a two-carbon atom end of which is bonded to $X^1$ and the other two-carbon atom end of which is bonded to $X^2$.

Another method of controlling a polymerization reaction in a polymerization reactor system is provided, and in this embodiment, the method can comprise:

(i) introducing a transition metal-based catalyst system, an olefin monomer, and optionally an olefin comonomer into a polymerization reactor within the polymerization reactor system;
(ii) contacting the transition metal-based catalyst system with the olefin monomer and the optional olefin comonomer under polymerization conditions to produce an olefin polymer, and
(iii) introducing a catalyst deactivating agent into the polymerization reactor to partially or completely terminate the polymerization reaction in the polymerization reactor.

Another method of controlling a polymerization reaction in a polymerization reactor system is provided, and in this embodiment, the method can comprise:

(1) introducing a transition metal-based catalyst system, an olefin monomer, and optionally an olefin comonomer into a polymerization reactor within the polymerization reactor system;
(2) contacting the transition metal-based catalyst system with the olefin monomer and the optional olefin comonomer under polymerization conditions to produce an olefin polymer, and
(3) introducing a catalyst deactivating agent into the polymerization reactor system downstream of the polymerization reactor to completely terminate the polymerization reaction.

Another method of controlling a polymerization reaction in a polymerization reactor system is provided herein, and this method can comprise:

(a) introducing a transition metal-based catalyst system, an olefin monomer, and optionally an olefin comonomer into a polymerization reactor within the polymerization reactor system;
(b) contacting the transition metal-based catalyst system with the olefin monomer and the optional olefin comonomer under polymerization conditions to produce an olefin polymer,
(c) monitoring a process variable to detect an undesired condition in the polymerization reactor system; and
(d) when the undesired reaction condition has reached a predetermined critical level, introducing a catalyst deactivating agent into the polymerization reactor.

Yet, in another embodiment, a method of controlling a polymerization reaction in a polymerization reactor system directed to transitioning between catalyst systems is provided. This method can comprise:

(A) introducing a first transition metal-based catalyst system, a first olefin monomer, and optionally a first olefin comonomer into a polymerization reactor in the polymerization reactor system;
(B) contacting the first transition metal-based catalyst system with the first olefin monomer and the optional first olefin comonomer under polymerization conditions to produce a first olefin polymer,
(C) discontinuing the introducing of the first transition metal-based catalyst system into the polymerization reactor before, during, or after a step of introducing a catalyst deactivating agent into the polymerization reactor; and
(D) introducing a second transition metal-based catalyst system into the polymerization reactor and contacting the second transition metal-based catalyst system with a second olefin monomer and optionally a second olefin comonomer under polymerization conditions to produce a second olefin polymer.

Definitions

Figure 1:
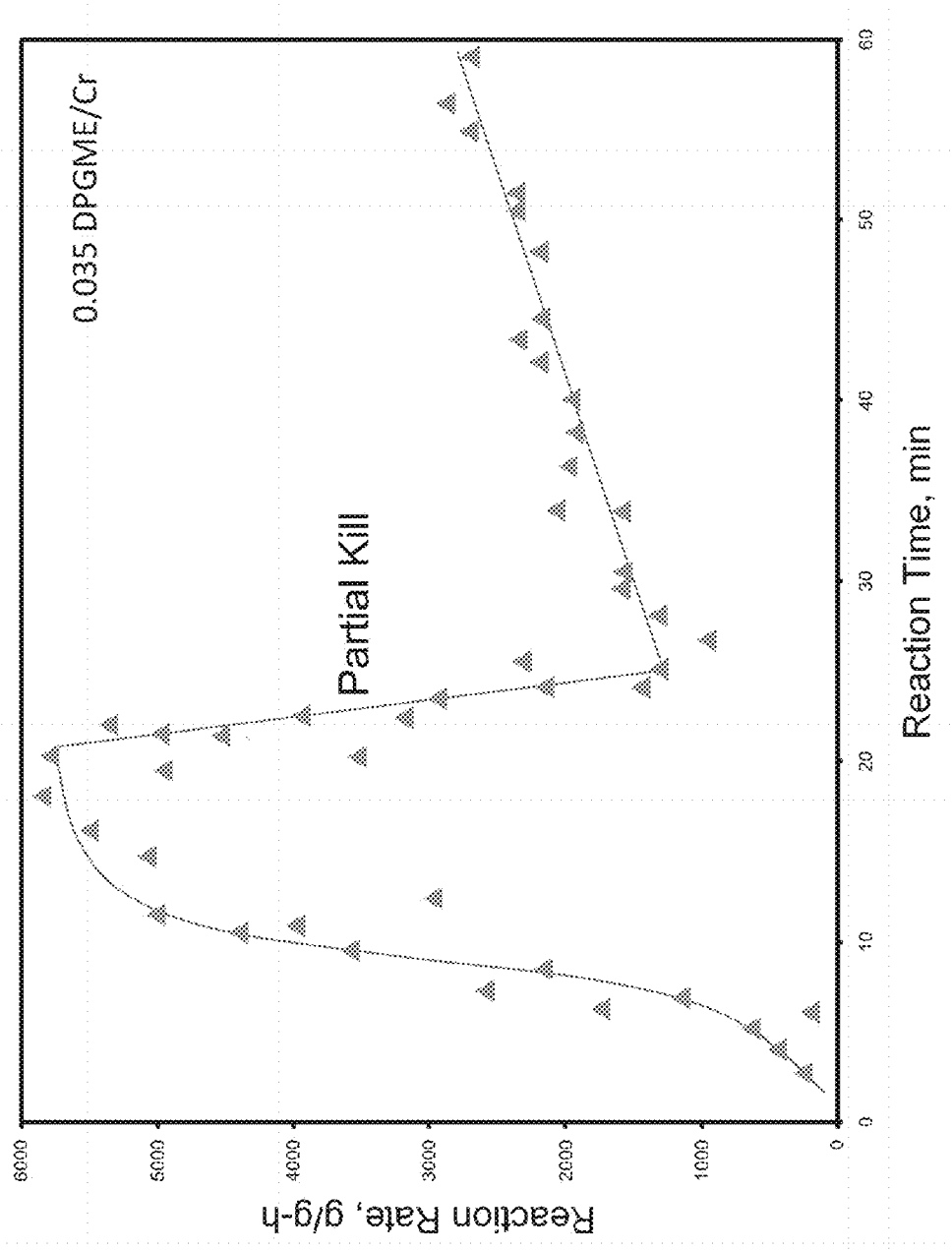
FIG. 1 presents a plot of the reaction rate versus the reaction time for Example 1 at a DPGME/Cr molar ratio of 0.035:1.
Figure 2:
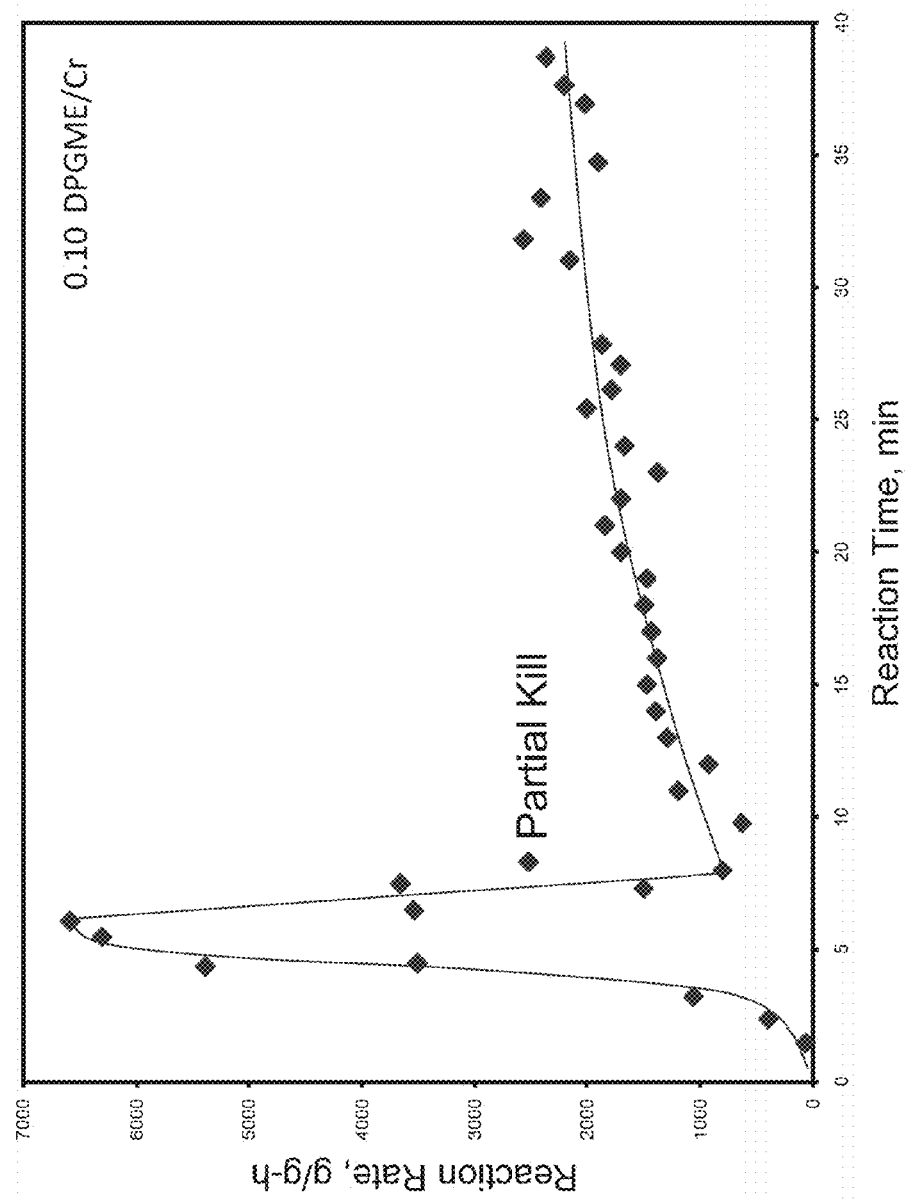
FIG. 2 presents a plot of the reaction rate versus the reaction time for Example 2 at a DPGME/Cr molar ratio of 0.1:1.
Figure 3:
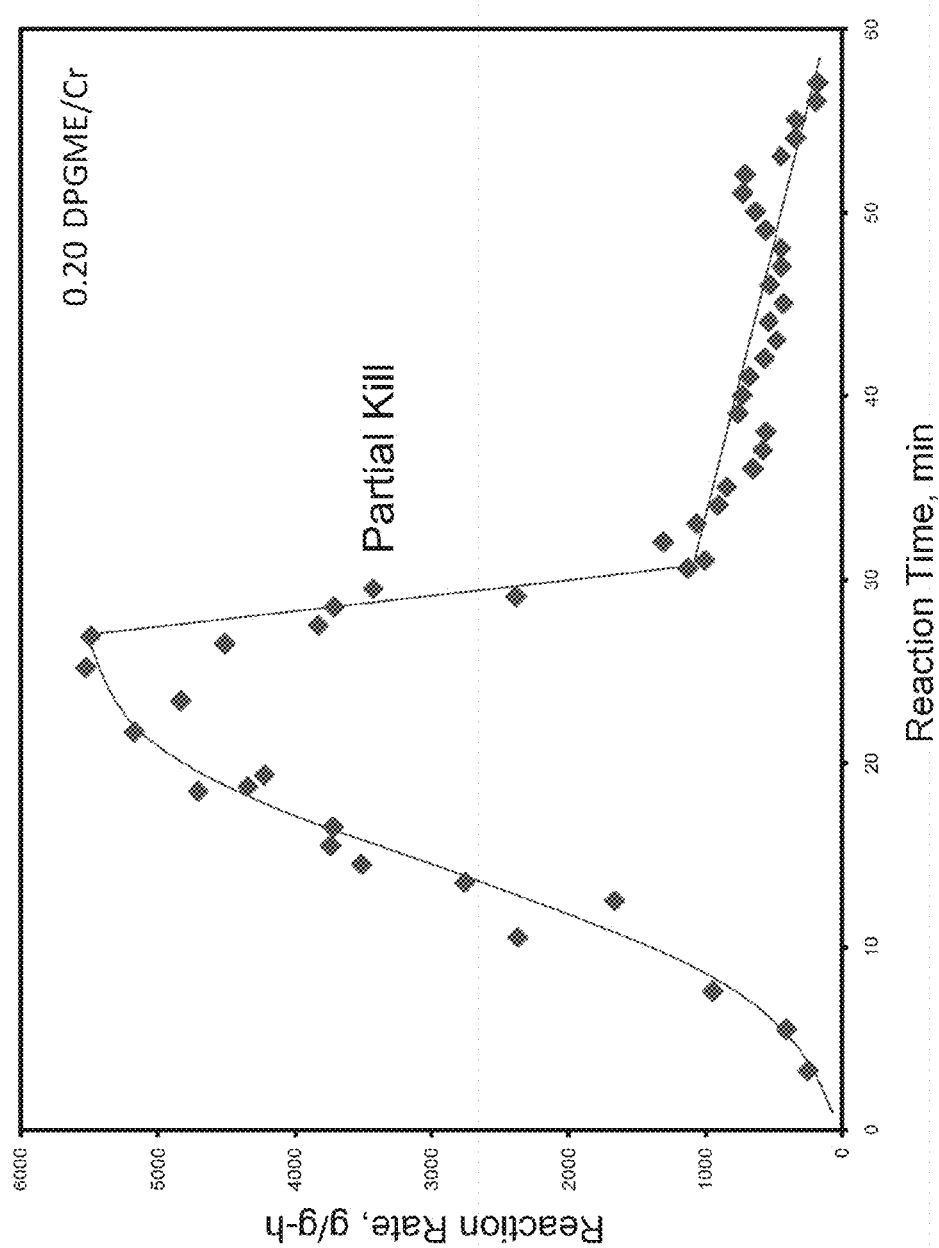
FIG. 3 presents a plot of the reaction rate versus the reaction time for Example 3 at a DPGME/Cr molar ratio of 0.2:1.
Figure 4:
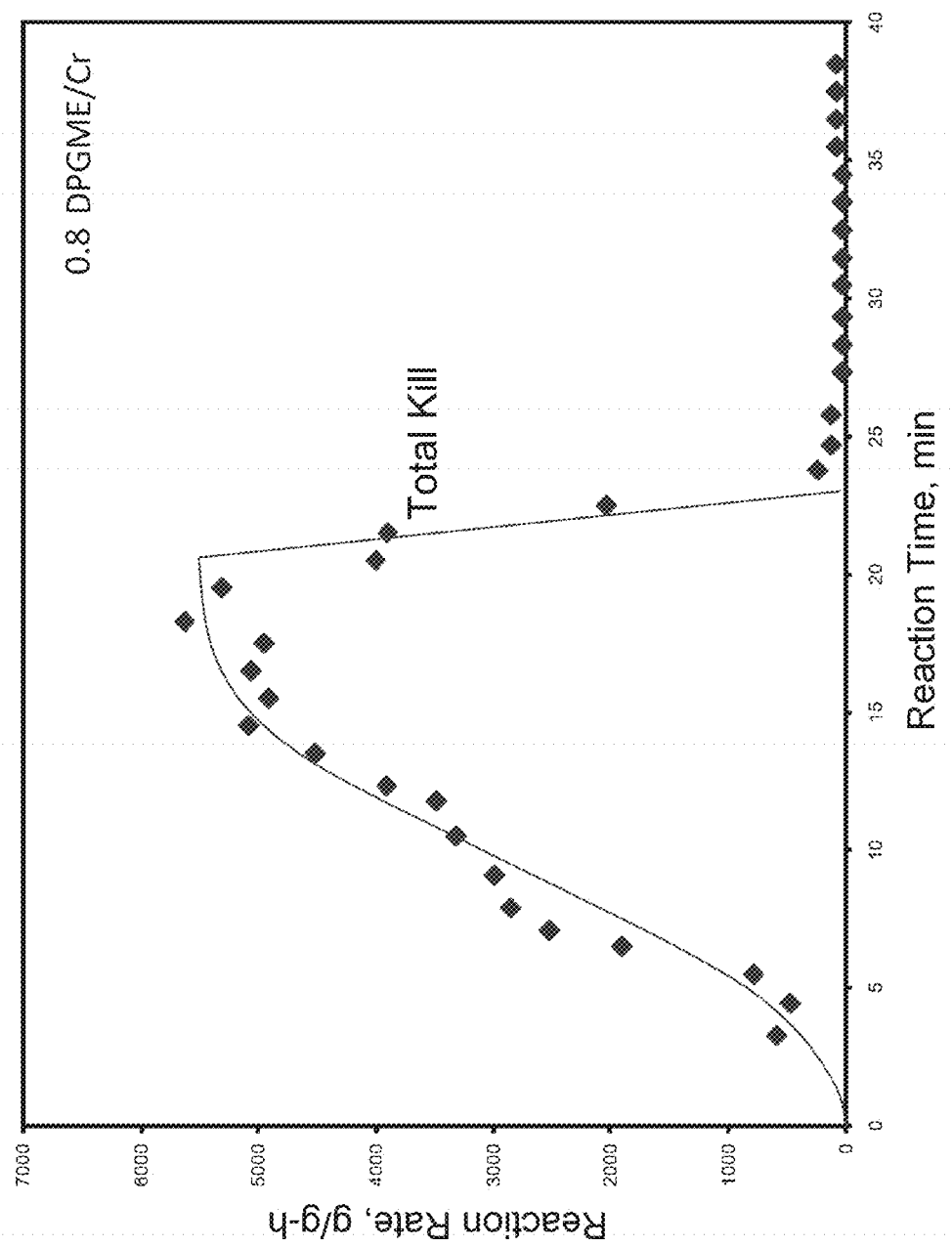
FIG. 4 presents a plot of the reaction rate versus the reaction time for Example 6 at a DPGME/Cr molar ratio of 0.8:1.

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, $2^{nd}$ Ed (1997) can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Regarding claim transitional terms or phrases, the transitional term "comprising," which is synonymous with "including," "containing," "having," or "characterized by," is inclusive or open-ended and does not exclude additional, unrecited elements or method steps. The transitional phrase "consisting of" excludes any element, step, or ingredient not specified in the claim. The transitional phrase "consisting essentially of" limits the scope of a claim to the specified materials or steps and those that do not materially affect the basic and novel characteristic(s) of the claim. A "consisting essentially of" claim occupies a middle ground between closed claims that are written in a "consisting of" format and fully open claims that are drafted in a "comprising" format. Absent an indication to the contrary, describing a compound or composition as "consisting essentially of" is not to be construed as "comprising," but is intended to describe the recited component that includes materials which do not significantly alter the composition or method to which the term is applied. For example, a feedstock consisting essentially of a material A can include impurities typically present in a commercially produced or commercially available sample of the recited compound or composition. When a claim includes different features and/or feature classes (for example, a method step, feedstock features, and/or product features, among other possibilities), the transitional terms comprising, consisting essentially of, and consisting of apply only to the feature class to which it is utilized, and it is possible to have different transitional terms or phrases utilized with different features within a claim. For example, a method can comprise several recited steps (and other non-recited steps), but utilize a system preparation consisting of specific components; alternatively, consisting essentially of specific components; or alternatively, comprising the specific components and other non-recited components.

While compositions and methods are often described in terms of "comprising" various components or steps, the compositions and methods can also "consist essentially of" or "consist of" the various components or steps, unless stated otherwise.

The terms "a," "an," and "the" are intended to include plural alternatives, e.g., at least one. For instance, the disclosure of "a catalyst deactivating agent," "an olefin comonomer," etc., is meant to encompass one, or mixtures or combinations of more than one, catalyst deactivating agent, olefin comonomer, etc., unless otherwise specified.

For any particular compound or group disclosed herein, any name or structure (general or specific) presented is intended to encompass all conformational isomers, regioisomers, stereoisomers, and mixtures thereof that can arise from a particular set of substituents, unless otherwise specified. The name or structure (general or specific) also encompasses all enantiomers, diastereomers, and other optical isomers (if there are any) whether in enantiomeric or racemic forms, as well as mixtures of stereoisomers, as would be recognized by a skilled artisan, unless otherwise specified. A general reference to pentane, for example, includes n-pentane, 2-methyl-butane, and 2,2-dimethylpropane; and a general reference to a butyl group includes a n-butyl group, a sec-butyl group, an iso-butyl group, and a t-butyl group.

Within this disclosure, the normal rules of organic nomenclature will prevail. For instance, when referencing substituted compounds or groups, references to substitution patterns are taken to indicate that the indicated group(s) is(are) located at the indicated position and that all other non-indicated positions are hydrogen. For example, reference to a 4-substituted phenyl group indicates that there is a non-hydrogen substituent located at the 4 position and hydrogens located at the 2, 3, 5, and 6 positions. By way of another example, reference to a 3-substituted naphth-2-yl indicates that there is a non-hydrogen substituent located at the 3 position and hydrogens located at the 1, 4, 5, 6, 7, and 8 positions. References to compounds or groups having substitutions at positions in addition to the indicated position will be referenced using comprising or some other alternative language. For example, a reference to a phenyl group comprising a substituent at the 4 position refers to a phenyl group having a substituent at the 4 position and hydrogen or any non-hydrogen substituent at the 2, 3, 5, and 6 positions.

In one embodiment, a chemical "group" can be defined or described according to how that group is formally derived from a reference or "parent" compound, for example, by the number of hydrogen atoms removed from the parent compound to generate the group, even if that group is not literally synthesized in such a manner. These groups can be utilized as substituents or coordinated or bonded to metal atoms. By way of example, an "alkyl group" formally can be derived by removing one hydrogen atom from an alkane, while an "alkylene group" formally can be derived by removing two hydrogen atoms from an alkane. Moreover, a more general term can be used to encompass a variety of groups that formally are derived by removing any number ("one or more") hydrogen atoms from a parent compound, which in this example can be described as an "alkane group," and which encompasses an "alkyl group." an "alkylene group," and materials having three or more hydrogen atoms, as necessary for the situation, removed from an alkane. The disclosure that a substituent, ligand, or other chemical moiety can constitute a particular "group" implies that the well-known rules of chemical structure and bonding are followed when that group is employed as described. When describing a group as being "derived by," "derived from," "formed by," or "formed from," such terms are used in a formal sense and are not intended to reflect any specific synthetic methods or procedures, unless specified otherwise or the context requires otherwise.

Also, unless otherwise specified, any carbon-containing group for which the number of carbon atoms is not specified can have, according to proper chemical practice, 1, 2, 3, 4, 5, 6, 7, 8, 9, 10, 11, 12, 13, 14, 15, 16, 17, or 18 carbon atoms, or any range or combination of ranges between these values. For example, unless otherwise specified, any carbon-containing group can have from 1 to 18 carbon atoms, from 1 to 15 carbon atoms, from 1 to 12 carbon atoms, from 1 to 10 carbon atoms, from 1 to 8 carbon atoms, or from 1 to 5 carbon atoms, and the like. Moreover, other identifiers or qualifying terms can be utilized to indicate the presence of, or absence of, a particular substituent, a particular regiochemistry, and/or stereochemistry, or the presence of absence of a branched underlying structure or backbone. Any specific carbon-containing group is limited according to the chemical and structural requirements for that specific group, as understood by one of ordinary skill. For example, unless otherwise specified, an aryl group can have from 6 to 18 carbon atoms, from 6 to 15 carbon atoms, from 6 to 12 carbon atoms, or from 6 to 10 carbon atoms, and the like. Thus, according to proper chemical practice and unless otherwise specified, an aryl group can have 6, 7, 8, 9, 10, 11, 12, 13, 14, 15, 16, 17, or 18 carbon atoms, or any range or combination of ranges between these values.

Other numerical ranges are disclosed herein. When Applicants disclose or claim a range of any type, Applicants' intent is to disclose or claim individually each possible number that such a range could reasonably encompass, including end points of the range as well as any sub-ranges and combinations of sub-ranges encompassed therein, unless otherwise specified. As a representative example, Applicants disclose that a molar ratio of a catalyst deactivating agent to a transition metal in a transition metal-based catalyst system can be in a range from 0.01:1 to 10:1 in certain embodiments. By a disclosure that the molar ratio of the catalyst deactivating agent to the transition metal in the transition metal-based catalyst system can be in a range from 0.01:1 to 10:1. Applicants intend to recite that the molar ratio can be 0.01:1, about 0.02:1, about 0.03:1, about 0.04:1, about 0.05:1, about 0.06:1, about 0.07:1, about 0.08:1, about 0.09:1, about 0.1:1, about 0.2:1, about 0.3:1, about 0.4:1, about 0.5:1, about 0.6:1, about 0.7:1, about 0.8:1, about 0.9:1, about 1:1, about 1.5:1, about 2:1, about 2.5:1, about 3:1, about 3.5:1, about 4:1, about 4.5:1, about 5:1, about 5.5:1, about 6:1, about 6.5:1, about 7:1, about 7.5:1 about 8:1, about 8.5:1 about 9:1, about 9.5:1, or 10:1. Additionally, the molar ratio can be within any range from 0.01:1 to 10:1 (for example, the molar ratio can be in a range from about 0.02:1 to about 2:1), and this also includes any combination of ranges between 0.01:1 and 10:1. Likewise, all other ranges disclosed herein should be interpreted in a manner similar to these examples.

Applicants reserve the right to proviso out or exclude any individual members of any such group, including any sub-ranges or combinations of sub-ranges within the group, that can be claimed according to a range or in any similar manner, if for any reason Applicants choose to claim less than the full measure of the disclosure, for example, to account for a reference that Applicants can be unaware of at the time of the filing of the application. Further. Applicants reserve the right to proviso out or exclude any individual substituents, analogs, compounds, ligands, structures, or groups thereof, or any members of a claimed group, if for any reason Applicants choose to claim less than the full measure of the disclosure, for example, to account for a reference that Applicants can be unaware of at the time of the filing of the application.

The term "substituted" when used to describe a group or a chain of carbon atoms, for example, when referring to a substituted analog of a particular group or chain, is intended to describe or group or chain wherein any non-hydrogen moiety formally replaces a hydrogen in that group or chain, and is intended to be non-limiting. A group or chain also can be referred to herein as "unsubstituted" or by equivalent terms such as "non-substituted," which refers to the original group or chain. "Substituted" is intended to be non-limiting and can include hydrocarbon substituents as specified and as understood by one of ordinary skill in the art.

The term "hydrocarbon" whenever used in this specification and claims refers to a compound containing only carbon and hydrogen. Other identifiers can be utilized to indicate the presence of particular groups in the hydrocarbon (e.g., halogenated hydrocarbon indicates the presence of one or more halogen atoms replacing an equivalent number of hydrogen atoms in the hydrocarbon). The term "hydrocarbyl group" is used herein in accordance with the definition specified by IUPAC: a univalent group formed by removing a hydrogen atom from a hydrocarbon (that is, a group containing only carbon and hydrogen). Similarly, a "hydrocarbylene group" refers to a group formed by removing two hydrogen atoms from a hydrocarbon, either two hydrogen atoms from one carbon atom or one hydrogen atom from each of two different carbon atoms. Therefore, in accordance with the terminology used herein, a "hydrocarbon group" refers to a generalized group formed by removing one or more hydrogen atoms (as needed for the particular group) from a hydrocarbon. A "hydrocarbyl group," "hydrocarbylene group," and "hydrocarbon group" can be acyclic or cyclic groups, and/or can be linear or branched. A "hydrocarbyl group," "hydrocarbylene group," and "hydrocarbon group" can include rings, ring systems, aromatic rings, and aromatic ring systems, which contain only carbon and hydrogen. "Hydrocarbyl groups," "hydrocarbylene groups," and "hydrocarbon groups" include, by way of example, aryl, arylene, arene groups, alkyl, alkylene, alkane groups, cycloalkyl, cycloalkylene, cycloalkane groups, aralkyl, aralkylene, and aralkane groups, respectively, among other groups as members.

An aliphatic compound is a non-aromatic organic compound. An "aliphatic group" is a generalized group formed by removing one or more hydrogen atoms (as needed for the particular group) from the carbon atoms of an aliphatic compound. An aliphatic compound can be acyclic or cyclic, saturated or unsaturated, and/or linear or branched organic compound. Aliphatic compounds and aliphatic groups can contain organic functional group(s) and/or atom(s) other than carbon and hydrogen unless otherwise specified (e.g., an aliphatic hydrocarbon).

The term "alkane" whenever used in this specification and claims refers to a saturated hydrocarbon compound. Other identifiers can be utilized to indicate the presence of particular groups in the alkane (e.g., halogenated alkane indicates the presence of one or more halogen atoms replacing an equivalent number of hydrogen atoms in the alkane). The term "alkyl group" is used herein in accordance with the definition specified by IUPAC: a univalent group formed by removing a hydrogen atom from an alkane. An "alkane group" is a general term that refers to a group formed by removing one or more hydrogen atoms (as needed for the particular group) from an alkane. An "alkyl group" and "alkane group" can be linear or branched unless otherwise specified. Primary, secondary, and tertiary alkyl groups can be derived by removal of a hydrogen atom from a primary, secondary, and tertiary carbon atom, respectively, of an alkane. The n-alkyl group can be derived by removal of a hydrogen atom from a terminal carbon atom of a linear alkane. The groups RCH$_2$ (R≠H), R$_2$CH (R≠H), and R$_3$C (R≠H) are primary, secondary, and tertiary alkyl groups, respectively. The carbon atom by which indicated moiety is attached is a secondary, tertiary, and quaternary carbon atom, respectively.

A cycloalkane is a saturated cyclic hydrocarbon, with or without side chains (e.g., cyclobutane or methylcyclobutane). Unsaturated cyclic hydrocarbons having at least one non-aromatic endocyclic carbon-carbon double or one triple bond are cycloalkenes and cycloalkynes, respectively. Unsaturated cyclic hydrocarbons having more than one such multiple bond can further specify the number and/or position(s) of such multiple bonds (e.g., cycloalkadienes, cycloalkatrienes, and so forth). The unsaturated cyclic hydrocarbons can be further identified by the position of the carbon-carbon multiple bond(s).

A "cycloalkyl group" is a univalent group derived by removing a hydrogen atom from a ring carbon atom from a cycloalkane. For example, a 1-methylcyclopropyl group and a 2-methylcyclopropyl group are illustrated as follows:

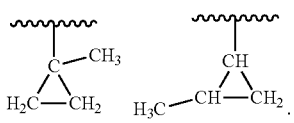

A "cycloalkylene group" refers to a group derived by removing two hydrogen atoms from a cycloalkane, at least one of which is a ring carbon. Thus, a "cycloalkylene group" includes a group derived from a cycloalkane in which two hydrogen atoms are formally removed from the same ring carbon, a group derived from a cycloalkane in which two hydrogen atoms are formally removed from two different ring carbons, and a group derived from a cycloalkane in which a first hydrogen atom is formally removed from a ring carbon and a second hydrogen atom is formally removed from a carbon atom that is not a ring carbon. A "cycloalkane group" refers to a generalized group formed by removing one or more hydrogen atoms (as necessary for the particular group and at least one of which is a ring carbon) from a cycloalkane.

The term "alkene" whenever used in this specification and claims refers to a compound that has at least one non-aromatic carbon-carbon double bond. The term "alkene" includes aliphatic or aromatic, cyclic or acyclic, and/or linear and branched alkenes unless expressly stated otherwise. Alkenes can also be further identified by the position of the carbon-carbon double bond. Alkenes having more than one such multiple bond are alkadienes, alkatrienes, and so forth. The alkene can be further identified by the position(s) of the carbon-carbon double bond(s).

An "alkenyl group" is a univalent group derived from an alkene by removal of a hydrogen atom from any carbon atom of the alkene. Thus, "alkenyl group" includes groups in which the hydrogen atom is formally removed from an sp$^2$ hybridized (olefinic) carbon atom and groups in which the hydrogen atom is formally removed from any other carbon atom. For example and unless otherwise specified, propen-1-yl (—CH═CHCH$_3$), propen-2-yl [(CH$_3$)C═CH$_2$], and propen-3-yl (—CH$_2$CH═CH$_2$) groups are all encompassed with the term "alkenyl group." Similarly, an "alkenylene group" refers to a group formed by formally removing two hydrogen atoms from an alkene, either two hydrogen atoms from one carbon atom or one hydrogen atom from two different carbon atoms. An "alkene group" refers to a generalized group formed by removing one or more hydrogen atoms (as needed for the particular group) from an alkene. When the hydrogen atom is removed from a carbon atom participating in a carbon-carbon double bond, the regiochemistry of the carbon from which the hydrogen atom is removed, and regiochemistry of the carbon-carbon double bond can both be specified. Alkenyl groups can also have more than one such multiple bond. The alkene group can also be further identified by the position(s) of the carbon-carbon double bond(s).

The term "alkyne" is used in this specification and claims to refer to a compound that has at least one carbon-carbon triple bond. The term "alkyne" includes aliphatic or aromatic, cyclic or acyclic, and/or linear and branched alkynes unless expressly stated otherwise. Alkynes having more than one such multiple bond are alkadiynes, alkatriynes, and so forth. The alkyne group can also be further identified by the position(s) of the carbon-carbon triple bond(s).

An "alkynyl group" is a univalent group derived from an alkyne by removal of a hydrogen atom from any carbon atom of the alkyne. Thus, "alkynyl group" includes groups in which the hydrogen atom is formally removed from an sp hybridized (acetylenic) carbon atom and groups in which the hydrogen atom is formally removed from any other carbon atom. For example and unless otherwise specified, 1-propyn-1-yl (—C≡CCH$_3$) and propyn-3-yl (HC≡CCH$_2$—) groups are encompassed with the term "alkynyl group." Similarly, an "alkynylene group" refers to a group formed by formally removing two hydrogen atoms from an alkyne, either two hydrogen atoms from one carbon atom if possible or one hydrogen atom from two different carbon atoms. An "alkyne group" refers to a generalized group formed by removing one or more hydrogen atoms (as needed for the particular group) from an alkyne. Alkyne groups can have more than one such multiple bond. Alkyne groups can also be further identified by the position(s) of the carbon-carbon triple bond(s).

An "aromatic group" refers to a generalized group formed by removing one or more hydrogen atoms (as needed for the particular group and at least one of which is an aromatic ring carbon atom) from an aromatic compound. Thus, an "aromatic group" as used herein refers to a group derived by removing one or more hydrogen atoms from an aromatic compound, that is, a compound containing a cyclically conjugated hydrocarbon that follows the Hückel (4n+2) rule and containing (4n+2) pi-electrons, where n is an integer from 1 to about 5. Aromatic compounds and hence "aromatic groups" can be monocyclic or polycyclic unless otherwise specified. Aromatic compounds include "arenes" (hydrocarbon aromatic compounds), examples of which can include, but are not limited to, benzene, naphthalene, and toluene, among others. As disclosed herein, the term "substituted" can be used to describe an aromatic group wherein any non-hydrogen moiety formally replaces a hydrogen in that group, and is intended to be non-limiting.

An "aryl group" refers to a generalized group formed by removing a hydrogen atom from an aromatic hydrocarbon ring carbon atom from an arene. One example of an "aryl group" is ortho-tolyl (o-tolyl), the structure of which is shown here.

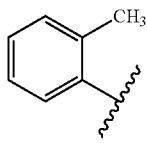 [SMILES: *c1ccccc1C]

Similarly, an "arylene group" refers to a group formed by removing two hydrogen atoms (at least one of which is from an aromatic hydrocarbon ring carbon) from an arene. An "arene group" refers to a generalized group formed by removing one or more hydrogen atoms (as needed for the particular group and at least one of which is an aromatic hydrocarbon ring carbon) from an arene.

An "aralkyl group" is an aryl-substituted alkyl group having a free valance at a non-aromatic carbon atom, for example, a benzyl group is an "aralkyl" group. Similarly, an "aralkylene group" is an aryl-substituted alkylene group having two free valances at a single non-aromatic carbon atom or a free valence at two non-aromatic carbon atoms while an "aralkane group" is a generalized is an aryl-substituted alkane group having one or more free valances at a non-aromatic carbon atom(s).

The term "polymer" is used herein generically to include olefin homopolymers, copolymers, terpolymers, and so forth. A copolymer can be derived from an olefin monomer and one olefin comonomer, while a terpolymer can be derived from an olefin monomer and two olefin comonomers. Accordingly, "polymer" encompasses copolymers, terpolymers, etc., derived from any olefin monomer and comonomer(s) disclosed herein. Similarly, an ethylene polymer would include ethylene homopolymers, ethylene copolymers, ethylene terpolymers, and the like. As an example, an olefin copolymer, such as an ethylene copolymer, can be derived from ethylene and a comonomer, such as 1-butene, 1-hexene, or 1-octene. If the monomer and comonomer were ethylene and 1-hexene, respectively, the resulting polymer could be categorized an as ethylene/1-hexene copolymer. The term "polymer" also is meant to include all molecular weight polymers, and is inclusive of lower molecular weight polymers or oligomers. Applicants intend for the term "polymer" to encompass oligomers derived from any olefin monomer disclosed herein (as well from an olefin monomer and one olefin comonomer, an olefin monomer and two olefin comonomers, and so forth).

In like manner, the scope of the term "polymerization" includes homopolymerization, copolymerization, terpolymerization, etc., as well as processes that might also be referred to as oligomerization processes. Therefore, a copolymerization process would involve contacting an olefin monomer (e.g., ethylene) and an olefin comonomer (e.g., 1-hexene) to produce an olefin copolymer.

The terms "contact product," "contacting," and the like, are used herein to describe compositions wherein the components are contacted together in any order, in any manner, and for any length of time. For example, the components can be contacted by blending or mixing. Further, unless otherwise specified, the contacting of any component can occur in the presence or absence of any other component of the compositions described herein. Combining additional materials or components can be done by any suitable method. Further, the term "contact product" includes mixtures, blends, solutions, slurries, reaction products, and the like, or combinations thereof. Although "contact product" can, and often does, include reaction products, it is not required for the respective components to react with one another. Likewise, "contacting" two or more components can result in a reaction product or a reaction mixture. Consequently, depending upon the circumstances, a "contact product" can be a mixture, a reaction mixture, or a reaction product.

Although any methods and materials similar or equivalent to those described herein can be used in the practice or testing of the invention, the typical methods and materials are herein described.

All publications and patents mentioned herein are incorporated herein by reference for the purpose of describing and disclosing, for example, the constructs and methodologies that are described in the publications, which might be used in connection with the presently described invention. The publications discussed throughout the text are provided solely for their disclosure prior to the filing date of the present application. Nothing herein is to be construed as an admission that the inventors are not entitled to antedate such disclosure by virtue of prior invention.

DETAILED DESCRIPTION OF THE INVENTION

Disclosed herein are catalyst deactivating agents and methods for controlling a polymerization reaction in a polymerization reactor system using these catalyst deactivating agents. Compositions containing a catalyst deactivating agent also are provided.

Methods Utilizing a Catalyst Deactivating Agent

Methods of controlling a polymerization reaction in a polymerization reactor system are disclosed. In an embodiment, a method of controlling a polymerization reaction in a polymerization reactor system can be directed to partially or completely terminating the polymerization reaction in a polymerization reactor within the polymerization reactor system, and/or to completely terminating the polymerization reaction downstream of the polymerization reactor. In such instances, the polymerization reaction can comprise contacting a transition metal-based catalyst system with an olefin monomer and optionally an olefin comonomer in the polymerization reactor under polymerization conditions to produce an olefin polymer. The method of controlling the polymerization reaction (e.g., a method of terminating the polymerization reaction) can comprise introducing a catalyst deactivating agent into the polymerization reactor and/or downstream of the polymerization reactor.

Generally, the features of the methods disclosed herein (e.g., the transition metal-based catalyst system, the olefin monomer, the catalyst deactivating agent, the polymerization reactor, among others) are independently described herein, and these features can be combined in any combination to further describe the disclosed methods.

One method of controlling a polymerization reaction in a polymerization reactor system consistent with embodiments disclosed herein can comprise:
(i) introducing a transition metal-based catalyst system, an olefin monomer, and optionally an olefin comonomer into a polymerization reactor within the polymerization reactor system;
(ii) contacting the transition metal-based catalyst system with the olefin monomer and the optional olefin comonomer under polymerization conditions to produce an olefin polymer, and
(iii) introducing a catalyst deactivating agent into the polymerization reactor to partially or completely terminate the polymerization reaction in the polymerization reactor.

The catalyst deactivating agent can be introduced (e.g., added, injected, etc.) into the polymerization reactor by any suitable means, either alone or with a carrier (e.g., a carrier gas, a carrier liquid, etc.). The polymerization reaction occurring within the polymerization reactor system may be terminated for any of a number of reasons. Illustrative examples can include, but are not limited to, an excessive reactor temperature, a rapid increase in reactor temperature, an excessive reactor pressure, a rapid increase in reactor pressure, a loss of reactor coolant, a loss of gas flow in a fluidized bed reactor, an electrical failure in the reactor system, a mechanical failure in the reactor system, and an interruption in the operation of a piece of equipment downstream of the reactor, among others. Additionally, and depending upon the circumstances surrounding the reason for terminating the polymerization reaction, the termination of the polymerization reaction can be accomplished either in a controlled manner or under rapid/emergency conditions. Additionally, and depending upon the circumstances, it may be beneficial to partially terminate the polymerization reaction (e.g., maintain some catalyst activity and/or some polymer production rate), instead of completely terminating the polymerization reaction.

Another method of controlling a polymerization reaction in a polymerization reactor system consistent with embodiments disclosed herein can comprise:
(1) introducing a transition metal-based catalyst system, an olefin monomer, and optionally an olefin comonomer into a polymerization reactor within the polymerization reactor system;
(2) contacting the transition metal-based catalyst system with the olefin monomer and the optional olefin comonomer under polymerization conditions to produce an olefin polymer, and
(3) introducing a catalyst deactivating agent into the polymerization reactor system downstream of the polymerization reactor to completely terminate the polymerization reaction.

The catalyst deactivating agent can be introduced (e.g., added, injected, etc.) downstream of the polymerization reactor by any suitable means, either alone or with a carrier (e.g., a carrier gas, a carrier liquid, etc.). Typically, the polymerization reaction can be terminated in an outlet pipe, in a discharge pipe, etc., or in another means of conveyance, from the polymerization reactor. Often, the catalyst deactivating agent can be added prior to a separations device or apparatus. The addition of a catalyst deactivating agent downstream of the reactor can neutralize any remaining active catalyst in the olefin polymer, and prevent any further reaction with olefin monomer and/or comonomer. Moreover, the addition of the catalyst deactivating agent downstream of the reactor can be substantially continuous and optionally at a fixed ratio based upon the polymer production or output rate. Using the disclosed catalyst deactivating agents to terminate the polymerization reaction and neutralize residual catalyst at this stage in the polymerization reactor system can, for instance, reduce skin formation in downstream equipment, prevent interactions with additives such as antioxidants, and reduce off-color formation in the polymer. In addition, certain catalyst deactivating agents disclosed herein can remain with the olefin polymer, if desired, and do not have to be evaporated/separated from the polymer, recycled, dried, etc.

Yet another method of controlling a polymerization reaction in a polymerization reactor system consistent with embodiments disclosed herein can comprise:
(a) introducing a transition metal-based catalyst system, an olefin monomer, and optionally an olefin comonomer into a polymerization reactor within the polymerization reactor system;
(b) contacting the transition metal-based catalyst system with the olefin monomer and the optional olefin comonomer under polymerization conditions to produce an olefin polymer,
(c) monitoring a process variable to detect an undesired condition in the polymerization reactor system; and
(d) when the undesired reaction condition has reached a predetermined critical level, introducing a catalyst deactivating agent into the polymerization reactor.

Many process variables can be monitored during the operation of a polymerization reactor in a polymerization reactor system. These can include, but are not limited to, reactor temperature, reactor pressure, catalyst system flow rate into the reactor, monomer flow rate (and comonomer, if employed) into the reactor, olefin polymer output rate, recycle rate, hydrogen flow rate (if employed), reactor cooling status, and the like. Process variables can be monitored to detect an undesired condition in the polymerization reactor system. As a non-limiting example, the reactor temperature can be monitored to ensure that the temperature within the reactor does not increase to an undesired temperature, or that the rate of increase of the temperature within the reactor does not exceed an undesired level. As another example, the undesired condition can be a partial or complete loss of reactor cooling in the system. When the undesired condition has reached a predetermined critical level (e.g., a temperature which is too high, a rate of increase in temperature which is too rapid, a complete loss of reactor cooling, etc.), the catalyst deactivating agent can be introduced into the polymerization reactor. As part of the operation of the polymerization reactor system, it can be predetermined that, depending upon the nature of the undesired condition, the deactivating agent can be introduced within 30 minutes, within 15 minutes, within 10 minutes, within 5 minutes, within 1 minute, or within 30 seconds, after the undesired condition reaches the predetermined critical level. It is also contemplated that the deactivating agent can be added to the polymerization reactor instantaneously upon determining that the undesired condition has reached the predetermined critical level.

In the methods of controlling a polymerization reaction in a polymerization reactor system described herein, Applicants also contemplate that these methods can further comprise a step of discontinuing the introducing of the transition metal-based catalyst system into the polymerization reactor within the polymerization reactor system. The step of discontinuing the introducing of the transition metal-based catalyst system into the polymerization reactor can occur before, during, or after the step of introducing the catalyst deactivating agent into the polymerization reactor. For example, in some embodiments, it can be beneficial to discontinue the introducing of the transition metal-based catalyst system into the polymerization reactor concurrently with the step of introducing the catalyst deactivating agent into the polymerization reactor. Moreover, these methods can further comprise a step of restarting polymerization in the polymerization reactor by re-introducing the transition metal-based catalyst into the polymerization reactor. Depending upon the circumstances related to the reason for adding the catalyst deactivating agent (e.g., an emergency shutdown, a planned long term outage, a short outage, etc.), polymerization often can be restarted within from 5-15 minutes to 36-48 hours after the step of introducing the catalyst deactivating agent into the polymerization reactor. Polymerization can be restarted, in some embodiments, within 12 hours, within 8 hours, within 6 hours, within 2 hours, or within 1 hour, after the step of introducing the catalyst deactivating agent into the polymerization reactor.

Likewise, in the methods disclosed herein, Applicants contemplate that these methods can further comprise a step of discontinuing the introducing of the olefin monomer into the polymerization reactor. This step can occur before, during, or after the step of introducing the catalyst deactivating agent into the polymerization reactor. As with the discontinuing the introducing of the transition metal-based catalyst system, it can be beneficial in some embodiments to discontinue the introducing of the olefin monomer into the polymerization reactor concurrently with the step of introducing the catalyst deactivating agent into the polymerization reactor. Additionally, these methods can further comprise a step of restarting polymerization in the polymerization reactor by re-introducing the olefin monomer into the polymerization reactor. As above, depending upon the circumstances related to the reason for adding the catalyst deactivating agent, polymerization often can be restarted within from 10 minutes to 36 hours, for example, after the step of introducing the catalyst deactivating agent into the polymerization reactor. In an embodiment, polymerization can be restarted within 12 hours, within 8 hours, within 6 hours, within 2 hours, or within 1 hour, after the step of introducing the catalyst deactivating agent into the polymerization reactor.

In the methods disclosed herein, a step can comprise introducing a transition metal-based catalyst system, an olefin monomer, and optionally an olefin comonomer into the polymerization reactor. As would be recognized by one of skill in the art, additional components can be introduced into the polymerization reactor in addition to the transition metal-based catalyst system and the olefin monomer (and, olefin comonomer(s), if desired), and such unrecited components are encompassed herein. For instance, in the operation of a polymerization reactor system—depending, of course, on the polymerization reactor type, the desired olefin polymer, etc., among other factors—solvents and/or diluents and/or fluidizing gases, recycle streams, hydrogen, etc., also can be added or introduced into the polymerization reactor and polymerization reactor system.

While the methods disclosed herein can further comprise a step of discontinuing the introducing of the olefin monomer and/or the transition metal-based catalyst system into the polymerization reactor, other process steps can be conducted before, during, or after the step of introducing the catalyst deactivating agent into the polymerization reactor or reactor system. For example, reactor vents can be opened before, during, or after the step of introducing the catalyst deactivating agent into the polymerization reactor or reactor system. The flow of a reactor recycle stream can be discontinued before, during, or after the step of introducing the catalyst deactivating agent into the polymerization reactor or reactor system. However, in some embodiments, it can be advantageous to continue the flow of the reactor recycle stream after the step of introducing the catalyst deactivating agent into the polymerization reactor to improve the distribution of the catalyst deactivating agent throughout the polymerization reactor system. It is also contemplated that only the non-recycled olefin monomer flow can be discontinued before, during, or after the step of introducing the catalyst deactivating agent into the polymerization reactor.

In another method of controlling a polymerization reaction in a polymerization reactor system consistent with embodiments disclosed herein, the method can comprise:

(A) introducing a first transition metal-based catalyst system, a first olefin monomer, and optionally a first olefin comonomer into a polymerization reactor in the polymerization reactor system;

(B) contacting the first transition metal-based catalyst system with the first olefin monomer and the optional first olefin comonomer under polymerization conditions to produce a first olefin polymer;

(C) discontinuing the introducing of the first transition metal-based catalyst system into the polymerization reactor before, during, or after a step of introducing a catalyst deactivating agent into the polymerization reactor; and (D) introducing a second transition metal-based catalyst system into the polymerization reactor and contacting the second transition metal-based catalyst system with a second olefin monomer and optionally a second olefin comonomer under polymerization conditions to produce a second olefin polymer.

This method of controlling a polymerization reaction in a polymerization reactor system can be directed to a method of transitioning from a first transition metal-based catalyst system to a second transition metal-based catalyst system in a polymerization reactor within the polymerization reactor system. In this method of controlling a polymerization reaction in a polymerization reactor system (e.g., transitioning from a first transition metal-based catalyst system to a second transition metal-based catalyst system), Applicants contemplate that the first transition metal-based catalyst system and the second transition metal-based catalyst system can be different catalyst systems (e.g., transitioning from a Ziegler-Natta based catalyst system to a metallocene-based catalyst system) or can be different catalyst systems of the same type (e.g., transitioning from a first metallocene-based catalyst system to a second metallocene-based catalyst system, transitioning form a first chromium-based catalyst system to a second chromium-based catalyst system, etc.). Additionally or alternatively, the first olefin polymer and the second olefin polymer can be different (e.g., transitioning from an ethylene homopolymer to an ethylene copolymer) or can be different grades of the same polymer type (e.g., transitioning from a first ethylene copolymer having a first melt index and a first density to a second ethylene copolymer having a second melt index and a second density). Likewise, the first olefin monomer and the second olefin monomer can be the same or different, and the first olefin comonomer (if used) and the second olefin comonomer (if used) can be the same or different. For instance, the first olefin monomer and the second olefin monomer can be the same, but no comonomer is used; alternatively, the first olefin monomer and the second olefin monomer can be different, but no comonomer is used; alternatively, the first olefin monomer and the second olefin monomer can be the same, and the first olefin comonomer and the second olefin comonomer can be the same or different; or alternatively, the first olefin monomer and the second olefin monomer can be the same, but no first olefin comonomer is used, and a second olefin comonomer is used. In circumstances where the second olefin monomer is different from the first olefin monomer and/or where the second olefin comonomer is different from the first olefin comonomer, the disclosed methods can further comprise a step of discontinuing the introducing of the first olefin monomer (and, if needed, discontinuing the introducing of the first olefin comonomer) into the polymerization reactor. This step can occur before, during, or after the step of introducing the catalyst deactivating agent into the polymerization reactor.

In each of the methods of controlling a polymerization reaction in a polymerization reactor system disclosed and described herein, the step of introducing the catalyst deactivating agent into the polymerization reactor (or into the polymerization reactor system downstream of the polymerization reactor) can reduce the catalyst activity of the transition metal-catalyst system and/or can reduce the production rate of the olefin polymer by at least 50%. Applicants contemplate that there can be instances where the catalyst activity and/or production rate may need to be decreased by 50% or more, as well as instances where a substantially complete or total termination of the polymerization reaction (95-100% decrease) may be needed. Hence, there are instances where the step of introducing the catalyst deactivating agent into the polymerization reactor (or into the polymerization reactor system downstream of the polymerization reactor) can reduce the catalyst activity of the transition metal-catalyst system and/or can reduce the production rate of the olefin polymer by at least 50%, while there are other instances where the step of introducing the catalyst deactivating agent into the polymerization reactor can reduce the catalyst activity of the transition metal-catalyst system and/or can reduce the production rate of the olefin polymer by at least 60%, by at least 70%, or by at least 80%. Furthermore, in certain embodiments, the step of introducing the catalyst deactivating agent into the polymerization reactor (or into the polymerization reactor system downstream of the polymerization reactor) can reduce the catalyst activity of the transition metal-catalyst system and/or can reduce the production rate of the olefin polymer by at least 85%; alternatively, by at least 90%; alternatively, by at least 95%; alternatively, by at least 98%; alternatively, by at least 99%, or alternatively, by 100%.

The step of introducing the catalyst deactivating agent into the polymerization reactor (or into the polymerization reactor system downstream of the polymerization reactor) can substantially reduce the catalyst activity of the transition metal-catalyst system and/or substantially reduce the production rate of the olefin polymer over a wide range of time periods, depending upon the desired circumstances, for example, in time periods ranging from as little as 1-30 seconds to as long as 1-2 hours. Often, however, the reduction in catalyst activity and/or production rate can be accomplished relatively rapidly. For instance, the step of introducing the catalyst deactivating agent into the polymerization reactor or reactor system can reduce the catalyst activity of the transition metal-catalyst system and/or can reduce the production rate of the olefin polymer by from 50% to 100% in a time period of less than 30 minutes, less than 15 minutes, less than 10 minutes, or less than 5 minutes, or less than one minute. In some embodiments, the step of introducing the catalyst deactivating agent into the polymerization reactor or reactor system can reduce the catalyst activity of the transition metal-catalyst system and/or reduce the production rate of the olefin polymer by at least 50%, by least 75%, by at least 85%, or by from 95-100%, in a time period of less than 5 minutes, less than 4 minutes, less than 3 minutes, or less than 2 minutes. In other embodiments, the catalyst activity of the transition metal-catalyst system and/or production rate of the olefin polymer can be reduced even more rapidly, such as, for example, a reduction of at least 50%, at least 75%, at least 85%, or by from 95-100%/o, etc., in less than 1 minute, in less than 45 seconds, or in less than 30 seconds. Further, the catalyst activity of the transition metal-catalyst system and/or production rate of the olefin polymer can be reduced by 95-100%, and this can occur instantaneously or substantially instantaneously. As one of skill in the art would recognize, the time period for reducing the catalyst activity and/or production rate can depend upon, for example, mass transfer limitations and/or residence time considerations within the polymerization reactor and polymerization reactor system.

In each of the methods of controlling a polymerization reaction in a polymerization reactor system disclosed and described herein, the catalyst deactivating agent can be introduced—into the polymerization reactor or into the polymerization reactor system downstream of the polymerization reactor—at a molar ratio of the catalyst deactivating agent to the transition metal in the transition metal-based catalyst system in a range from 0.001:1 to 1000:1, from 0.005:1 to 1000:1, from 0.01:1 to 500:1, from 0.01:1 to 400:1, or from 0.01:1 to 250:1. The amount of catalyst deactivating agent employed can vary depending on, for example, the type of transition metal-based catalyst system, whether a partial or complete termination of the polymerization reaction is desired, the desired time period or rapidness for terminating the polymerization reaction, whether the polymerization reaction will be restarted shortly after termination, etc., among other factors.

If the transition metal-based catalyst system is a chromium-based catalyst system, the molar ratio of the catalyst deactivating agent to chromium in the chromium-based catalyst system typically can be in a range from 0.001:1 to 1000:1, from 0.01:1 to 100:1, from 0.01:1 to 50:1, from 0.01:1 to 10:1, from 0.01:1 to 5:1, from 0.01 to 3:1, or from 0.02:1 to 2:1. In embodiments where a substantially complete or total termination of the polymerization reaction is desired (a 95-100% reduction in the catalyst activity of the transition metal-catalyst system and/or in the production rate of the olefin polymer), Applicants contemplate that the molar ratio of the catalyst deactivating agent to chromium that may be required can be less than 5:1, less than 3:1, or less than 2:1. Suitable ranges of this molar ratio can include, but are not limited to, from 0.01:1 to 5:1, from 0.01:1 to 3:1, from 0.01:1 to 2.5:1, from 0.02:1 to 2:1, or from 0.03:1 to 1.5:1. If a co-catalyst, such as an alkyl aluminum, is employed in the chromium-based catalyst system, the molar ratio of the catalyst deactivating agent to aluminum in the co-catalyst typically can be in the same general ranges: from 0.001:1 to 1000:1, from 0.01:1 to 100:1, from 0.01:1 to 50:1, from 0.01:1 to 10:1, from 0.01:1 to 5:1, from 0.01 to 3:1, or from 0.02:1 to 2:1. In embodiments where a substantially complete or total termination of the polymerization reaction is desired, Applicants contemplate that the molar ratio of the catalyst deactivating agent to aluminum in the co-catalyst that may be required can be less than 5:1, less than 3:1, less than 2.5:1, less than 2:1, or less than 1.5:1. Suitable ranges of this molar ratio can include, but are not limited to, from 0.01:1 to 5:1, from 0.01:1 to 2:1, from 0.02:1 to 2:1, from 0.02:1 to 1.5:1, or from 0.02:1 to 1:1.

If the transition metal-based catalyst system is a Ziegler-Natta based catalyst system, the molar ratio of the catalyst deactivating agent to titanium in the Ziegler-Natta based catalyst system typically can be in a range from 0.001:1 to 1000:1, from 0.01:1 to 100:1, from 0.05:1 to 50:1, from 0.1:1 to 25:1, from 0.1:1 to 15:1, from 0.2 to 10:1, or from 0.3:1 to 8:1. In embodiments where a substantially complete or total termination of the polymerization reaction is desired (a 95-100% reduction in the catalyst activity of the transition metal-catalyst system and/or in the production rate of the olefin polymer), Applicants contemplate that the molar ratio of the catalyst deactivating agent to titanium that may be required can be less than 20:1, less than 15:1, less than 12:1, or less than 10:1. Suitable ranges of this molar ratio can include, but are not limited to, from 0.1:1 to 20:1, from 0.1:1 to 15:1, from 0.2:1 to 12:1, from 0.2:1 to 10:1, or from 0.3:1 to 10:1. If a co-catalyst, such as an alkyl aluminum, is employed in the Ziegler-Natta based catalyst system, the molar ratio of the catalyst deactivating agent to aluminum in the co-catalyst typically can be in the range from 0.001:1 to 1000:1, from 0.01:1 to 100:1, from 0.01:1 to 10:1, from 0.01:1 to 5:1, from 0.02:1 to 3:1, from 0.05 to 2:1, or from 0.05:1 to 1.5:1. In embodiments where a substantially complete or total termination of the polymerization reaction is desired, Applicants contemplate that the molar ratio of the catalyst deactivating agent to aluminum in the co-catalyst that may be required can be less than 5:1, less than 3:1, less than 2.5:1, less than 2:1, or less than 1.5:1. Suitable ranges of this molar ratio can include, but are not limited to, from 0.01:1 to 5:1, from 0.02:1 to 2.5:1, from 0.02:1 to 2:1, from 0.05:1 to 2:1, or from 0.05:1 to 1.5:1.

If the transition metal-based catalyst system is a metallocene-based catalyst system, the molar ratio of the catalyst deactivating agent to transition metal in the metallocene-based catalyst system typically can be in a range from 0.001:1 to 1000:1, from 0.01:1 to 500:1, from 0.05:1 to 500:1, from 0.1:1 to 500:1, from 1:1 to 300:1, from 5:1 to 300:1, or from 5:1 to 250:1. In embodiments where a substantially complete or total termination of the polymerization reaction is desired (a 95-100% reduction in the catalyst activity of the transition metal-catalyst system and/or in the production rate of the olefin polymer), Applicants contemplate that the molar ratio of the catalyst deactivating agent to transition metal that may be required can be less than 500:1, less than 300:1, less than 250:1, or less than 200:1. Suitable ranges of this molar ratio can include, but are not limited to, from 1:1 to 300:1, from 1:1 to 250:1, from 5:1 to 250:1, from 10:1 to 200:1, or from 15:1 to 150:1. If a co-catalyst, such as an alkyl aluminum, is employed in the metallocene-based catalyst system, the molar ratio of the catalyst deactivating agent to aluminum in the co-catalyst typically can be in the range from 0.001:1 to 1000:1, from 0.01:1 to 100:1, from 0.01:1 to 10:1, from 0.01:1 to 5:1, from 0.02:1 to 3:1, from 0.05 to 2:1, or from 0.05:1 to 1.5:1. In embodiments where a substantially complete or total termination of the polymerization reaction is desired. Applicants contemplate that the molar ratio of the catalyst deactivating agent to aluminum in the co-catalyst that may be required can be less than 5:1, less than 3:1, less than 2.5:1, less than 2:1, or less than 1.5:1. Suitable ranges of this molar ratio can include, but are not limited to, from 0.01:1 to 5:1, from 0.02:1 to 2.5:1, from 0.02:1 to 2:1, from 0.05:1 to 2:1, or from 0.05:1 to 1.5:1.

The catalyst deactivating agent can be introduced into the polymerization reactor, or into the polymerization reactor system downstream of the polymerization reactor, without a carrier or diluent. Alternatively, the catalyst deactivating agent can be introduced into the polymerization reactor, or into the polymerization reactor system downstream of the polymerization reactor, in the form of a mixture, suspension, solution, etc., along with a hydrocarbon solvent. For instance, the catalyst deactivating agent can be suspended or dissolved in a hydrocarbon solvent(s), and the catalyst deactivating agent and the respective hydrocarbon solvent(s) can be introduced together into the polymerization reactor or reactor system. Exemplary hydrocarbon solvents can comprise (or consist essentially of, or consist of) a $C_3$ to $C_{10}$ hydrocarbon; alternatively, a $C_3$ to $C_{10}$ aliphatic hydrocarbon; alternatively, a $C_3$ to $C_8$ aliphatic hydrocarbon: or alternatively, a $C_4$ to $C_8$ aliphatic hydrocarbon. The aliphatic hydrocarbon can be cyclic or acyclic and/or can be linear or branched, unless otherwise specified. Illustrative aliphatic hydrocarbon solvents can include, but are not limited to, propane, isobutane, n-butane, n-pentane, isopentane, neopentane, n-hexane, heptane, octane, cyclohexane, cycloheptane, methylcyclohexane, methylcycloheptane, and the like, including mixtures or combinations thereof.

Moreover, the hydrocarbon solvent can comprise (or consist essentially of, or consist of) a $C_6$ to $C_{10}$ aromatic hydrocarbon or, alternatively, a $C_6$ to $C_8$ aromatic hydrocarbon. Illustrative aromatic hydrocarbon solvents can include, but are not limited to, benzene, toluene, xylene, ethylbenzene, and the like, including mixtures or combinations thereof.

In an embodiment, the catalyst deactivating agent can be suspended or dissolved in a hydrocarbon solvent, and the hydrocarbon solvent can comprise (or consist essentially of, or consist of) propane, isobutane, n-butane, n-pentane, isopentane, neopentane, n-hexane, heptane, octane, cyclohexane, cycloheptane, methylcyclohexane, methylcycloheptane, benzene, toluene, xylene, ethylbenzene, and the like, or a mixture thereof. In another embodiment, the hydrocarbon solvent can comprise propane, cyclohexane, isobutane, n-butane, n-pentane, isopentane, neopentane, n-hexane, or a mixture thereof. In yet another embodiment, the hydrocarbon solvent can comprise propane; alternatively, isobutane; alternatively, n-butane; alternatively, n-pentane; alternatively, isopentane; alternatively, neopentane; alternatively, n-hexane; alternatively, heptane; alternatively, octane; alternatively, cyclohexane; alternatively, cycloheptane; alternatively, methylcyclohexane; alternatively, methylcycloheptane; alternatively, benzene; alternatively, toluene; alternatively, xylene; or alternatively, ethylbenzene. In still another embodiment, the hydrocarbon solvent can comprise an ISOPAR® mixed aliphatic hydrocarbon solvent, such as, for example, ISOPAR® C, ISOPAR® E, ISOPAR® G, ISOPAR® H, ISOPAR® L, ISOPAR® M, or a mixture thereof.

In the above methods, the step of introducing the catalyst deactivating agent into the polymerization reactor, or into the polymerization reactor system downstream of the polymerization reactor, can substantially reduce the catalyst activity of the transition metal-catalyst system and/or substantially reduce the production rate of the olefin polymer. Catalyst activity can be measured, for example, in units of grams of olefin polymer (ethylene homopolymer, ethylene copolymer, propylene homopolymer, etc., as the context requires) per gram of transition metal per hour (g/g-TM/hr), or in units of grams of olefin polymer per mole of transition metal per hour (g/mol-TM/hr). The production rate of the olefin polymer or the polymer output rate can be measured, for example, in the same units as that of catalyst activity, or in units of pounds of olefin polymer produced per hour (lb/hr). In embodiments directed to continuous polymerization reactor systems (e.g., slurry, gas phase, solution, and the like), the impact of the step of introducing the catalyst deactivating agent into the polymerization reactor or reactor system on the production rate of the olefin polymer may be easier to quantify than the impact on the catalyst activity.

Catalyst Deactivating Agents

Consistent with embodiments disclosed herein, a catalyst deactivating agent can comprise any compound having two or more of O, N, and/or S atoms separated by at least two carbon atoms. As an example, a suitable compound can have two oxygen atoms separated by at least two carbon atoms (optionally, the compound can have more than two oxygen atoms).

In some embodiments, the catalyst deactivating agent can comprise a polyethylene glycol and/or a polypropylene glycol, while in other embodiments, the catalyst deactivating agent can comprise a compound having the formula:

$$R^1-X^1-R^3-X^2-R^2 \qquad (I).$$

Generally, the selections of $R^1$, $R^2$, $R^3$, $X^1$, and $X^2$ in formula (I) are independently described herein, and these selections can be combined in any combination to further describe the catalyst deactivating agent compound having formula (I).

In an embodiment, $R^1$ and $R^2$ independently can be hydrogen or a $C_1$ to $C_{18}$ hydrocarbyl group; alternatively, a $C_1$ to $C_{18}$ hydrocarbyl group; alternatively, hydrogen or a $C_1$ to $C_{12}$ hydrocarbyl group; alternatively, a $C_1$ to $C_{12}$ hydrocarbyl group; alternatively, hydrogen or a $C_1$ to $C_{10}$ hydrocarbyl group; alternatively, a $C_1$ to $C_{10}$ hydrocarbyl group; alternatively, hydrogen or a $C_1$ to $C_8$ hydrocarbyl group; alternatively, a $C_1$ to $C_8$ hydrocarbyl group; alternatively, hydrogen or a $C_1$ to $C_5$ hydrocarbyl group; or alternatively, a $C_1$ to $C_5$ hydrocarbyl group. In another embodiment, $R^1$ and $R^2$ independently can be hydrogen, a $C_1$ to $C_{18}$ alkyl group, a $C_2$ to $C_{18}$ alkenyl group, a $C_6$ to $C_{18}$ aryl group, or a $C_7$ to $C_{18}$ aralkyl group. For instance, $R^1$ and $R^2$ independently can be a $C_1$ to $C_{12}$ alkyl group, a $C_2$ to $C_{12}$ alkenyl group, a $C_6$ to $C_{15}$ aryl group, or a $C_7$ to $C_{15}$ aralkyl group; alternatively, $R^1$ and $R^2$ independently can be a $C_1$ to $C_{10}$ alkyl group, a $C_2$ to $C_{10}$ alkenyl group, a $C_6$ to $C_{12}$ aryl group, or a $C_7$ to $C_{12}$ aralkyl group; alternatively, $R^1$ and $R^2$ independently can a $C_1$ to $C_8$ alkyl group, a $C_2$ to $C_8$ alkenyl group, a $C_6$ to $C_{10}$ aryl group, or a $C_7$ to $C_{10}$ aralkyl group; or alternatively, $R^1$ and $R^2$ independently can be $C_1$ to $C_5$ alkyl group, a $C_2$ to $C_5$ alkenyl group, a $C_6$ to $C_8$ aryl group, or a $C_7$ to $C_8$ aralkyl group. It is contemplated in these and other embodiments that $R^1$ and $R^2$ can be the same, or that $R^1$ and $R^2$ can be different.

Accordingly, in some embodiments, the alkyl group which can be $R^1$ and/or $R^2$ in formula (I) can be a methyl group, an ethyl group, a propyl group, a butyl group, a pentyl group, a hexyl group, a heptyl group, an octyl group, a nonyl group, a decyl group, a undecyl group, a dodecyl group, a tridecyl group, a tetradecyl group, a pentadecyl group, a hexadecyl group, a heptadecyl group, or an octadecyl group; or alternatively, a methyl group, an ethyl group, a propyl group, a butyl group, a pentyl group, a hexyl group, a heptyl group, an octyl group, a nonyl group, or a decyl group. In other embodiments, the alkyl group which can be $R^1$ and/or $R^2$ in formula (I) can be a methyl group, an ethyl group, a n-propyl group, an iso-propyl group, a n-butyl group, an iso-butyl group, a sec-butyl group, a tert-butyl group, a n-pentyl group, an iso-pentyl group, a sec-pentyl group, or a neopentyl group; alternatively, a methyl group, an ethyl group, an iso-propyl group, a n-butyl group, a tert-butyl group, or a neopentyl group; alternatively, a methyl group; alternatively, an ethyl group; alternatively, a n-propyl group; alternatively, an iso-propyl group; alternatively, a n-butyl group; alternatively, a tert-butyl group; or alternatively, a neopentyl group.

Illustrative alkenyl groups which can be $R^1$ and/or $R^2$ in formula (I) can include, but are not limited to, an ethenyl group, a propenyl group, a butenyl group, a pentenyl group, a hexenyl group, a heptenyl group, an octenyl group, a nonenyl group, a decenyl group, a undecenyl group, a dodecenyl group, a tridecenyl group, a tetradecenyl group, a pentadecenyl group, a hexadecenyl group, a heptadecenyl group, or an octadecenyl group. In one embodiment, $R^1$ and/or $R^2$ in formula (I) can be an ethenyl group, a propenyl group, a butenyl group, a pentenyl group, a hexenyl group, a heptenyl group, an octenyl group, a nonenyl group, or a decenyl group, while in another embodiment, $R^1$ and/or $R^2$ in formula (I) can be an ethenyl group, a propenyl group, a butenyl group, a pentenyl group, or a hexenyl group. For example, $R^1$ and/or $R^2$ can be an ethenyl group; alternatively, a propenyl group; alternatively, a butenyl group; alternatively, a pentenyl group; or alternatively, a hexenyl group. In yet another embodiment, $R^1$ and/or $R^2$ can be an acyclic terminal alkenyl group, such as a $C_3$ to $C_{10}$, or a $C_3$ to $C_8$, terminal alkenyl group.

In some embodiments, the aryl group which can be $R^1$ and/or $R^2$ in formula (I) can be a phenyl group, a substituted phenyl group, a naphthyl group, or a substituted naphthyl group. In an embodiment, the aryl group can be a phenyl group or a substituted phenyl group; alternatively, a naphthyl group or a substituted naphthyl group; alternatively, a phenyl group or a naphthyl group; or alternatively, a substituted phenyl group or a substituted naphthyl group. Substituents which can be utilized for the substituted phenyl group or substituted naphthyl group are independently disclosed herein and can be utilized without limitation to further describe the substituted phenyl group or substituted naphthyl group which can be utilized as $R^1$ and/or $R^2$ in formula (I).

In an embodiment, the substituted phenyl group which can be utilized as $R^1$ and/or $R^2$ can be a 2-substituted phenyl group, a 3-substituted phenyl group, a 4-substituted phenyl group, a 2,4-disubstituted phenyl group, a 2,6-disubstituted phenyl group, 3,5-disubstituted phenyl group, or a 2,4,6-trisubstituted phenyl group. In other embodiments, the substituted phenyl group can be a 2-substituted phenyl group, a 4-substituted phenyl group, a 2,4-disubstituted phenyl group, or a 2,6-disubstituted phenyl group; alternatively, a 3-substituted phenyl group or a 3,5-disubstituted phenyl group; alternatively, a 2-substituted phenyl group or a 4-substituted phenyl group; alternatively, a 2,4-disubstituted phenyl group or a 2,6-disubstituted phenyl group; alternatively, a 2-substituted phenyl group; alternatively, a 3-substituted phenyl group; alternatively, a 4-substituted phenyl group; alternatively, a 2,4-disubstituted phenyl group; alternatively, a 2,6-disubstituted phenyl group; alternatively, 3,5-disubstituted phenyl group; or alternatively, a 2,4,6-trisubstituted phenyl group. Substituents which can be utilized for these specific substituted phenyl groups are independently disclosed herein and can be utilized without limitation to further describe these substituted phenyl groups which can be utilized as the $R^1$ and/or $R^2$ group of formula (I).

In some embodiments, the aralkyl group which can be utilized as $R^1$ and/or $R^2$ of formula (I) can be a benzyl group or a substituted benzyl group. Substituents which can be utilized for the substituted aralkyl group are independently disclosed herein and can be utilized without limitation to further describe the substituted aralkyl group which can be utilized as $R^1$ and/or $R^2$ of formula (I).

In an embodiment, each non-hydrogen substituent for the substituted aryl group or substituted aralkyl group which can be $R^1$ and/or $R^2$ in formula (I) independently can be a $C_1$ to $C_{10}$ hydrocarbyl group; alternatively, a $C_1$ to $C_8$ hydrocarbyl group; or alternatively, a $C_1$ to $C_5$ hydrocarbyl group. Specific substituent hydrocarbyl groups are independently disclosed herein and can be utilized without limitation to further describe the substituents of the substituted aryl group or substituted aralkyl group which can be $R^1$ and/or $R^2$ of formula (I). The number of substituents and their respective number of carbon atoms in any substituted aryl group or substituted aralkyl group is limited such that $R^1$ and $R^2$ of formula (I) have at most 18 carbon atoms. Exemplary hydrocarbyl substituents can include, but are not limited to, an alkyl group, such as a methyl group, an ethyl group, a n-propyl group, an isopropyl group, a n-butyl group, a sec-butyl group, an isobutyl group, a tert-butyl group, a n-pentyl group, a 2-pentyl group, a 3-pentyl group, a 2-methyl-1-butyl group, a tert-pentyl group, a 3-methyl-1-butyl group, a 3-methyl-2-butyl group, or a neo-pentyl group, and the like, including combinations thereof.

In one embodiment, $R^1$ and $R^2$ independently can be hydrogen, a $C_1$ to $C_{12}$ alkyl group, a $C_2$ to $C_{12}$ alkenyl group, a $C_6$ to $C_{15}$ aryl group, or a $C_7$ to $C_{15}$ aralkyl group; or alternatively, a $C_1$ to $C_{12}$ alkyl group, a $C_2$ to $C_{12}$ alkenyl group, a $C_6$ to $C_{15}$ aryl group, or a $C_7$ to $C_{15}$ aralkyl group. In another embodiment, $R^1$ and $R^2$ independently can be a $C_1$ to $C_{12}$ alkyl group or a $C_2$ to $C_{12}$ alkenyl group. In yet another embodiment, $R^1$ and $R^2$ independently can be hydrogen, methyl, ethyl, propyl, butyl, pentyl, hexyl, heptyl, octyl, nonyl, decyl, ethenyl, propenyl, butenyl, pentenyl, hexenyl, heptenyl, octenyl, nonenyl, decenyl, phenyl, benzyl, or tolyl; alternatively, methyl, ethyl, propyl, butyl, pentyl, hexyl, heptyl, octyl, nonyl, decyl, ethenyl, propenyl, butenyl, pentenyl, hexenyl, heptenyl, octenyl, nonenyl, decenyl, phenyl, benzyl, or tolyl; alternatively, hydrogen, methyl, ethyl, propyl, butyl, pentyl, hexyl, ethenyl, propenyl, butenyl, pentenyl, hexenyl, phenyl, benzyl, or tolyl; or alternatively, methyl, ethyl, propyl, butyl, pentyl, ethenyl, propenyl, butenyl, or pentenyl. In still another embodiment, $R^1$ and $R^2$ independently can be hydrogen, methyl, ethyl, propyl, or butyl, or both $R^1$ and $R^2$ can be hydrogen, methyl, ethyl, propyl, or butyl. For instance, $R^1$ and $R^2$ independently can be methyl, ethyl, propyl, or butyl. Additionally, it is contemplated that both $R^1$ and $R^2$ can be hydrogen, or methyl, or ethyl, or propyl, or butyl, or pentyl, or hexyl, and so forth.

In formula (I), $R^3$ can comprise up to 18 carbon atoms. In accordance with one embodiment, $R^3$ can act as a spacer between $X^1$ and $X^2$ of 2 carbon atoms, 3 carbon atoms, 4 carbon atoms, 5 carbon atoms, 6 carbon atoms, and so forth. For instance, $R^3$ can comprise up to 18 carbon atoms and can be a substituted or unsubstituted chain of at least two contiguous carbons atoms, one end of which is bonded to $X^1$ and the other end of which is bonded to $X^2$. Hence, $R^3$ can be an uninterrupted chain of from 2 to 18 carbon atoms connecting $X^1$ and $X^2$, optionally with branches/substitutions off of this contiguous chain. These branches/substitutions on a carbon atom(s) of the contiguous chain can be, for example, a $C_1$ to $C_{10}$ hydrocarbyl group, a $C_1$ to $C_8$ hydrocarbyl group, or $C_1$ to $C_5$ hydrocarbyl group. The number of branches/substitutions and their respective number of carbon atoms is limited such that $R^3$ of formula (I) has at most 18 carbon atoms. Additionally or alternatively, $R^3$ can be unsaturated (e.g., one or more carbon-carbon double and/or triple bonds) or saturated.

Accordingly, in one embodiment disclosed herein, $R^3$ can be a $C_2$-$C_{18}$ alkanediyl. The alkanediyl can be linear or branched. By describing $R^3$ as a $C_2$-$C_{18}$ "alkanediyl" moiety in formula (I), Applicants are specifying the number of carbon atoms in the respective moiety, along with the number of hydrogen atoms required to conform to the rules of chemical valence for the respective diyl moiety. For example, in formula (I), the fact that $R^3$ is bonded to two other groups ($X^1$ and $X^2$) is consistent with this description of an alkanediyl moiety. Unless otherwise specified, alkanediyl groups described herein are intended to include all structural isomers, linear or branched, of a given moiety; however, there must be at least 2 contiguous carbons of the alkanediyl moiety connecting $X^1$ and $X^2$ in formula (I).

In an embodiment, $R^3$ in formula (I) can be a linear or branched $C_2$-$C_{18}$ alkanediyl, $C_2$ to $C_{12}$ alkanediyl, $C_2$ to $C_{10}$ alkanediyl, $C_2$ to $C_8$ alkanediyl, or $C_2$ to $C_5$ alkanediyl. In another embodiment, $R^3$ can be a linear or branched $C_3$-$C_{12}$ alkanediyl, $C_3$ to $C_{10}$ alkanediyl, $C_4$ to $C_{10}$ alkanediyl, $C_3$ to $C_8$ alkanediyl, or $C_4$ to $C_8$ alkanediyl. In yet another embodiment, $R^3$ can be a linear or branched ethanediyl, propanediyl, butanediyl, pentanediyl, hexanediyl, heptanediyl, or octanediyl; alternatively, ethanediyl; alternatively, propanediyl; alternatively, butanediyl; alternatively, pentanediyl; alternatively, hexanediyl; alternatively, heptanediyl; or alternatively, octanediyl. As above, when $R^3$ is a linear or branched alkanediyl group, only alkanediyl groups comprising a contiguous chain of at least two carbon atoms, one end of which is bonded to $X^1$ and the other end of which is bonded to $X^2$, can be employed.

For example, if $R^3$ is a "propanediyl" group, suitable propanediyls would include 1,2-propanediyl and 1,3-propanediyl, but exclude 1,1-propanediyl and 2,2-propanediyl, as illustrated below:

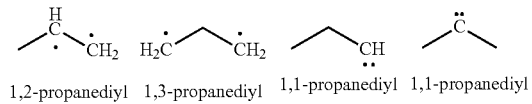

1,2-propanediyl   1,3-propanediyl   1,1-propanediyl   1,1-propanediyl

Similarly, if $R^3$ is a "butanediyl" group, suitable butandiyls would include, for example, n-butane-1,2-diyl, n-butane-1,3-diyl, n-butane-1,4-diyl, n-butane-2,3-diyl, and 2-methylpropane-1,3-diyl, but exclude, for example, n-butane-1,1-diyl and 2-methylpropane-1,1-diyl, as illustrated below.

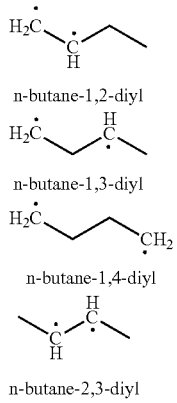

n-butane-1,2-diyl n-butane-1,3-diyl n-butane-1,4-diyl n-butane-2,3-diyl

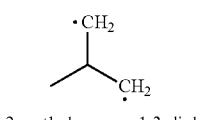
2-methylpropane-1,3-diyl

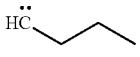
n-butane-1,1-diyl

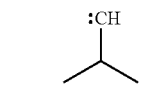
2-methylpropane-1,1-diyl

In formula (I), $R^3$ can comprise up to 18 carbon atoms and, in accordance with another embodiment, $R^3$ can be a substituted or unsubstituted ether, thioether, or amine group having at least four carbon atoms, a two-carbon atom end of which is bonded to $X^1$ and the other two-carbon atom end of which is bonded to $X^2$. Accordingly, $R^3$ can act as a spacer between $X^1$ and $X^2$ of a contiguous chain of at least 5 atoms; 2 carbon atoms; then O, S, or N; then 2 carbon atoms. Additional C, O, S, and/or N atoms can be present in the uninterrupted chain between $X^1$ and $X^2$, or can be present on a branch(es)/substitution(s) off of this chain. $R^3$ groups containing one or more of O, S, and/or N can be linear or branched, and can be unsaturated (e.g., one or more carbon-carbon double and/or triple bonds) or saturated. Illustrative examples of suitable $R^3$ ether, thioether, and amine groups can include, but are not limited to, the following groups:

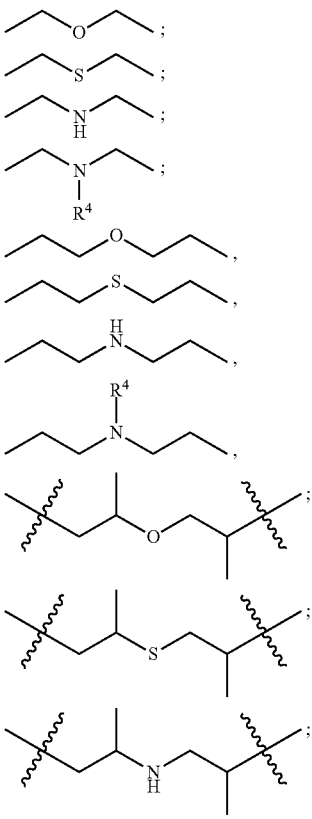

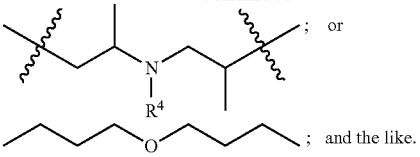

In the above groups with a tertiary amine, $R^4$ can be any $C_1$ to $C_{10}$ hydrocarbyl group, any $C_1$ to $C_8$ hydrocarbyl group, or any $C_1$ to $C_5$ hydrocarbyl group disclosed herein. As an example, $R^4$ can be a $C_1$ to $C_{10}$ alkyl group, a $C_2$ to $C_{10}$ alkenyl group, a $C_6$ to $C_{10}$ aryl group, or a $C_7$ to $C_{10}$ aralkyl group, and these groups can include, but are not limited to, methyl, ethyl, propyl, butyl, pentyl, hexyl, heptyl, octyl, nonyl, decyl, ethenyl, propenyl, butenyl, pentenyl, hexenyl, heptenyl, octenyl, nonenyl, decenyl, phenyl, benzyl, or tolyl, and the like. However, $R^4$ can be limited in size, such that the overall $R^3$ amine group does not exceed 18 total carbon atoms.

In an embodiment, $R^3$ can be a substituted or unsubstituted $C_4$-$C_{18}$ ether, $C_4$-$C_{18}$ thioether, or $C_4$-$C_{18}$ amine; alternatively, a $C_4$-$C_{12}$ ether; alternatively, a $C_4$-$C_{12}$ thioether; or alternatively, a $C_4$-$C_{12}$ amine. Branches/substitutions on the contiguous ether, thioether, or amine chain can be, for example, a $C_1$ to $C_{10}$ hydrocarbyl group, a $C_1$ to $C_8$ hydrocarbyl group, or $C_1$ to $C_5$ hydrocarbyl group. The number of branches/substitutions and their respective number of carbon atoms is limited such that $R^3$ of formula (I) has at most 18 carbon atoms.

In another embodiment, $R^3$ can be an ether having the formula —$R^{10}$—O—$R^{11}$—, a thioether having the formula —$R^{12}$—S—$R^{13}$—, or an amine having the formula —$R^{14}$—NH—$R^{15}$— or —$R^{14}$—N$R^4$—$R^{15}$—. In other embodiments, $R^3$ can be an ether having the formula —$R^{10}$—O—$R^{11}$—; alternatively, $R^3$ can be a thioether having the formula —$R^{12}$—S—$R^{13}$—; alternatively, $R^3$ can be an amine having the formula —$R^{14}$—NH—$R^{15}$—; or alternatively, $R^3$ can be an amine having the formula —$R^{14}$—N$R^4$—$R^{15}$—. In these formulas, $R^4$, as discussed above, can be any $C_1$ to $C_{10}$ hydrocarbyl group disclosed herein. $R^{10}$, $R^{11}$, $R^{12}$, $R^{13}$, $R^{14}$, and $R^{15}$ independently can be a linear or branched $C_2$ to $C_{15}$ alkanediyl, linear or branched $C_2$ to $C_{10}$ alkanediyl, or linear or branched $C_2$ to $C_6$ alkanediyl. As above, at least two carbons of the alkanediyl must be present between $X^1$ and either the O, S, or N atom, and at least two carbons must be present between $X^2$ and the O, S, or N atom. The number of carbon atoms in $R^{10}$, $R^{11}$, $R^{12}$, $R^{13}$, $R^{14}$, and $R^{15}$ can be limited, since the overall $R^3$ group does not exceed 18 total carbon atoms.

In formula (I), $X^1$ and $X^2$ independently can be O, S, or NR, wherein R can be hydrogen or a $C_1$ to $C_{18}$ hydrocarbyl group. R can be any $C_1$ to $C_{18}$ hydrocarbyl group, any $C_1$ to $C_{12}$ hydrocarbyl group, any $C_1$ to $C_{10}$ hydrocarbyl group, any $C_1$ to $C_8$ hydrocarbyl group, or any $C_1$ to $C_5$ hydrocarbyl group disclosed herein. As an example, R can be a $C_1$ to $C_{12}$ alkyl group, a $C_2$ to $C_{12}$ alkenyl group, a $C_6$ to $C_{15}$ aryl group, or a $C_7$ to $C_{15}$ aralkyl group, and these groups can include, but are not limited to, methyl, ethyl, propyl, butyl, pentyl, hexyl, heptyl, octyl, nonyl, decyl, ethenyl, propenyl, butenyl, pentenyl, hexenyl, heptenyl, octenyl, nonenyl, decenyl, phenyl, benzyl, or tolyl, and the like.

In one embodiment, $X^1$ and $X^2$ in formula (I) independently can be O, S, or NH, while in another embodiment, $X^1$ and $X^2$ in formula (I) independently can be O or S. Yet, in other embodiments, both $X^1$ and $X^2$ can be NR, both $X^1$ and $X^2$ can be NH, both $X^1$ and $X^2$ can be S, or both $X^1$ and $X^2$ can be O.

In accordance with another embodiment, the catalyst deactivating agent can have formula (I), as shown below:

$$R^1—X^1—R^3—X^2—R^2 \quad (I);$$

wherein, in formula (I), $X^1$ and $X^2$ independently can be O, S, or NR, and R can be hydrogen or a $C_1$ to $C_{18}$ hydrocarbyl group. Additionally, $R^1$ and $R^2$ independently can be hydrogen or a $C_1$ to $C_{18}$ hydrocarbyl group, or $R^1$ and $R^2$ independently can be a $C_1$ to $C_{18}$ hydrocarbyl group. $R^3$ can comprise up to 18 carbon atoms and can be (i) a substituted or unsubstituted chain of at least two contiguous carbons atoms, one end of which is bonded to $X^1$ and the other end of which is bonded to $X^2$, or (ii) a substituted or unsubstituted ether, thioether, or amine group having at least four carbon atoms, a two-carbon atom end of which is bonded to $X^1$ and the other two-carbon atom end of which is bonded to $X^2$.

In accordance with another embodiment, the catalyst deactivating agent can have formula (I), and $X^1$ and $X^2$ independently can be O or S. Additionally, $R^1$ and $R^2$ independently can be hydrogen, methyl, ethyl, propyl, butyl, pentyl, hexyl, heptyl, octyl, nonyl, decyl, ethenyl, propenyl, butenyl, pentenyl, hexenyl, heptenyl, octenyl, nonenyl, or decenyl, or $R^1$ and $R^2$ independently can be methyl, ethyl, propyl, butyl, pentyl, hexyl, heptyl, octyl, nonyl, decyl, ethenyl, propenyl, butenyl, pentenyl, hexenyl, heptenyl, octenyl, nonenyl, or decenyl. $R^3$ can be a $C_2$-$C_8$ linear or branched alkanediyl, or a $C_4$-$C_{12}$ ether, $C_4$-$C_{12}$ thioether, or $C_4$-$C_{12}$ amine.

In accordance with yet another embodiment, the catalyst deactivating agent can have formula (II), as shown below:

$$R^1—O—R^3—O—R^2 \quad (II);$$

wherein, in formula (II), the selections of $R^1$, $R^2$, and $R^3$ can be the same as those described herein for formula (I). For example, $R^1$ and $R^2$ independently can be a hydrogen or a $C_1$ to $C_{18}$ hydrocarbyl group or, alternatively. $R^1$ and $R^2$ independently can be hydrogen, a $C_1$ to $C_{12}$ alkyl group (e.g., methyl, ethyl, propyl, butyl, etc.), or a $C_2$ to $C_{12}$ acyclic alkenyl group. $R^3$ can comprise up to 18 carbon atoms and can be (i) a substituted or unsubstituted chain of at least two contiguous carbons atoms, one end of which is bonded to $X^1$ and the other end of which is bonded to $X^2$, or (ii) a substituted or unsubstituted ether, thioether, or amine group having at least four carbon atoms, a two-carbon atom end of which is bonded to $X^1$ and the other two-carbon atom end of which is bonded to $X^2$. Alternatively. $R^3$ can be a $C_2$-$C_8$ linear or branched alkanediyl, or a $C_4$-$C_{12}$ ether, $C_4$-$C_{12}$ thioether, or $C_4$-$C_{12}$ amine.

Illustrative examples of suitable catalyst deactivating agents can include, but are not limited to, the following compounds:

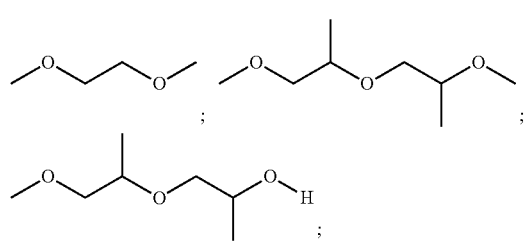

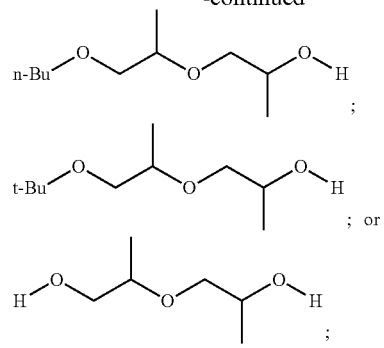

and the like, or a combination thereof.

In certain embodiments, the catalyst deactivating agent can comprise a polyethylene glycol, a polypropylene glycol, or combinations thereof. Generally, suitable polyethylene glycols and polypropylene glycols can have average molecular weights of less than 5000 g/mol, less than 4000 g/mol, less than 3000 g/mol, less than 2500 g/mol, or less than 1000 g/mol. Polyethylene glycols and polypropylene glycols with average molecular weights as low as 200 g/mol, 250 g/mol, or 300 g/mol can be employed, therefore, contemplated ranges of average molecular weight can include, but are not limited to, from 200 to 5000, from 200 to 4000, from 250 to 4000, from 250 to 3000, from 300 to 3000, from 250 to 2500, from 300 to 2500, from 250 to 1500, from 300 to 1500, from 250 to 1000, or from 300 to 1000 g/mol.

In accordance with an embodiment disclosed herein, the catalyst deactivating agent can have a boiling point of at least 70° C., such as, for example, a boiling point of at least 80° C., a boiling point of at least 90° C., or a boiling point of at least 100° C. Catalyst deactivating agents having boiling points of at least 120° C., or at least 150° C., can be employed as well. Yet, in another embodiment, the catalyst deactivating agent can have a boiling point in the 70° C. to 400° C. range; alternatively, a boiling point in the 70° C. to 350° C. range; alternatively, a boiling point in the 80° C. to 300° C. range; alternatively, a boiling point in the 80° C. to 275° C. range; alternatively, a boiling point in the 80° C. to 250° C. range; alternatively, a boiling point in the 100° C. to 350° C. range; alternatively, a boiling point in the 125° C. to 350° C. range; alternatively, a boiling point in the 125° C. to 300° C. range; or alternatively, a boiling point in the 150° (to 275° C. range.

The catalyst deactivating agent can be miscible with and/or soluble in a hydrocarbon solvent. For instance, the catalyst deactivating agent can be miscible with and/or soluble in a hydrocarbon solvent comprising (or consisting essentially of, or consisting of) a $C_3$ to $C_{10}$ hydrocarbon; alternatively, a $C_3$ to $C_{10}$ aliphatic hydrocarbon; alternatively, a $C_3$ to $C_8$ aliphatic hydrocarbon; or alternatively, a $C_4$ to $C_8$ aliphatic hydrocarbon. The aliphatic hydrocarbon can be cyclic or acyclic and/or can be linear or branched, unless otherwise specified. Illustrative aliphatic hydrocarbon solvents can include, but are not limited to, propane, isobutane, n-butane, n-pentane, isopentane, neopentane, n-hexane, heptane, octane, cyclohexane, cycloheptane, methylcyclohexane, methylcycloheptane, and the like, including mixtures or combinations thereof.

Furthermore, the catalyst deactivating agent can be miscible with and/or soluble in a hydrocarbon solvent comprising (or consisting essentially of, or consisting of) a $C_6$ to $C_{10}$ aromatic hydrocarbon or, alternatively, a $C_6$ to $C_8$ aromatic hydrocarbon. Illustrative aromatic hydrocarbon solvents can include, but are not limited to, benzene, toluene, xylene, ethylbenzene, and the like, including mixtures or combinations thereof.

In one embodiment, the catalyst deactivating agent can be miscible with and/or soluble in propane, isobutane, n-butane, n-pentane, isopentane, neopentane, n-hexane, heptane, octane, cyclohexane, cycloheptane, methylcyclohexane, methylcycloheptane, benzene, toluene, xylene, ethylbenzene, or a mixture thereof. In another embodiment, the catalyst deactivating agent can be miscible with and/or soluble in propane, cyclohexane, isobutane, n-butane, n-pentane, isopentane, neopentane, n-hexane, or a mixture thereof. In yet another embodiment, the catalyst deactivating agent can be miscible with and/or soluble in propane; alternatively, isobutane; alternatively, n-butane; alternatively, n-pentane; alternatively, isopentane; alternatively, neopentane; alternatively, n-hexane; alternatively, heptane; alternatively, octane; alternatively, cyclohexane; alternatively, cycloheptane; alternatively, methylcyclohexane; alternatively, methylcycloheptane; alternatively, benzene; alternatively, toluene; alternatively, xylene; or alternatively, ethylbenzene.

Applicants also contemplate that the catalyst deactivating agent can be miscible with and/or soluble in an ISOPAR® mixed aliphatic hydrocarbon solvent, such as, for example, ISOPAR® C, ISOPAR® E, ISOPAR® G, ISOPAR® H, ISOPAR® L, ISOPAR® M, or a mixture thereof.

Catalyst Systems

The methods disclosed herein are not limited to any particular transition-metal based catalyst system suitable for the polymerization of an olefin monomer. The transition-metal based catalyst system can comprise, for example, a transition metal (one or more than one) from Groups IIIB-VIIIB of the Periodic Table of the Elements. In one embodiment, the transition metal-based catalyst system can comprise a Group III, IV, V, or VI transition metal, or a combination of two or more transition metals. The transition metal-based catalyst system can comprise chromium, titanium, zirconium, hafnium, vanadium, or a combination thereof, or can comprise chromium, titanium, zirconium, hafnium, or a combination thereof, in other embodiments. Accordingly, the transition metal-based catalyst system can comprise chromium, or titanium, or zirconium, or hafnium, either singly or in combination.

Various transition metal-based catalyst systems known to a skilled artisan are useful in the polymerization of olefins. These include, but are not limited to, Ziegler-Natta based catalyst systems, chromium-based catalyst systems, metallocene-based catalyst systems, and the like, including combinations thereof. The methods disclosed herein are not limited to the aforementioned catalyst systems, but Applicants nevertheless contemplate particular embodiments directed to these catalyst systems. Hence, the transition metal-based catalyst system can be a Ziegler-Natta based catalyst system, a chromium-based catalyst system, and/or a metallocene-based catalyst system; alternatively, a Ziegler-Natta based catalyst system; alternatively, a chromium-based catalyst system; or alternatively, a metallocene-based catalyst system. Examples of representative and non-limiting transition metal-based catalysts systems include those disclosed in the U.S. Pat. Nos. 3,887,494, 3,119,569, 4,053,436, 4,981,831, 4,364,842, 4,444,965, 4,364,855, 4,504,638, 4,364,854, 4,444,964, 4,444,962, 3,976,632, 4,248,735, 4,297,460, 4,397,766, 2,825,721, 3,225,023, 3,226,205, 3,622,521, 3,625,864, 3,900,457, 4,301,034, 4,547,557, 4,339,559, 4,806,513, 5,037,911, 5,219,817, 5,221,654, 3,887,494, 3,900,457, 4,053,436, 4,081,407, 4,296,001, 4,392,990, 4,405,501, 4,981,831, 4,151,122, 4,247,421, 4,248,735, 4,297,460, 4,397,769, 4,460,756, 4,182,815, 4,735,931, 4,820,785, 4,988,657, 5,436,305, 5,610,247, 5,627,247, 3,242,099, 4,808,561, 5,275,992, 5,237,025, 5,244,990, 5,179,178, 4,855,271, 5,179,178, 5,275,992, 3,887,494, 3,119,569, 3,900,457, 4,981,831, 4,364,842, 4,444,965, 4,939,217, 5,210,352, 5,436,305, 5,401,817, 5,631,335, 5,571,880, 5,191,132, 5,480,848, 5,399,636, 5,565,592, 5,347,026, 5,594,078, 5,498,581, 5,496,781, 5,563,284, 5,554,795, 5,420,320, 5,451,649, 5,541,272, 5,705,478, 5,631,203, 5,654,454, 5,705,579, 5,668,230, 6,300,271, 6,831,141, 6,653,416, 6,613,712, 7,294,599, 6,355,594, 6,395,666, 6,833,338, 7,417,097, 6,548,442, and 7,312,283, each of which is incorporated herein by reference in its entirety.

While not intending to be bound by theory, the catalyst deactivating agent may reduce the catalyst activity of the transition metal-catalyst system and/or reduce the production rate of the olefin polymer by neutralizing or interacting with the transition metal present in the transition metal-based catalyst system. In catalyst systems that contain a co-catalyst, the catalyst deactivating agent may additionally reduce the catalyst activity of the transition metal-catalyst system and/or reduce the production rate of the olefin polymer by neutralizing or interacting with the co-catalyst present in the transition metal-based catalyst system, although this is not a requirement.

Commonly used polymerization co-catalysts can include, but are not limited to, metal alkyl, or organometal, co-catalysts, with the metal encompassing boron, aluminum, and the like. For instance, alkyl boron and/or alkyl aluminum compounds often can be used as co-catalysts in a transition metal-based catalyst system. Representative compounds can include, but are not limited to, tri-n-butyl borane, tripropylborane, triethylborane, triethylaluminum, triisobutylaluminum, diethylaluminum chloride, and the like, including combinations thereof.

Olefin Monomers

Olefin monomers contemplated herein typically include olefin compounds having from 2 to 30 carbon atoms per molecule and having at least one olefinic double bond. Homopolymerization processes using a single olefin, such as ethylene, propylene, butene, hexene, octene, and the like, are encompassed, as well as copolymerization, terpolymerization, etc., reactions using an olefin monomer with at least one different olefinic compound. As previously disclosed, polymerization processes are meant to encompass oligomerization processes as well.

As an example, any resultant ethylene copolymers, terpolymers, etc., generally can contain a major amount of ethylene (>50 mole percent) and a minor amount of comonomer (<50 mole percent). Comonomers that can be copolymerized with ethylene often have from 3 to 20 carbon atoms in their molecular chain.

Acyclic, cyclic, polycyclic, terminal ($\alpha$), internal, linear, branched, substituted, unsubstituted, functionalized, and non-functionalized olefins can be employed. For example, typical unsaturated compounds that can be polymerized to produce olefin polymers can include, but are not limited to, ethylene, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-hexene, 3-ethyl-1-hexene, 1-heptene, 2-heptene, 3-heptene, the four normal octenes (e.g., 1-octene), the four normal nonenes, the five normal decenes, and the like, or mixtures of two or more of these compounds. Cyclic and bicyclic olefins, including but not limited to, cyclopentene, cyclohexene, norbornylene, norbornadiene, and the like, also can be polymerized as described herein. Styrene also can be employed as a monomer or as a comonomer. In an embodiment, the olefin monomer can be a $C_2$-$C_{20}$ olefin; alternatively, a $C_2$-$C_{12}$ olefin; alternatively, a $C_2$-$C_{10}$ α-olefin; alternatively, ethylene, propylene, 1-butene, 1-hexene, or 1-octene; alternatively, ethylene or propylene; alternatively, ethylene; or alternatively, propylene.

When a copolymer (or alternatively, a terpolymer) is desired, the olefin monomer can be, for example, ethylene or propylene, which is copolymerized with at least one comonomer. According to one embodiment, the olefin monomer in the polymerization process can be ethylene. In this embodiment, examples of suitable olefin comonomers can include, but are not limited to, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-ethyl-1-hexene, 1-heptene, 2-heptene, 3-heptene, 1-octene, 1-decene, styrene, and the like, or combinations thereof. According to one embodiment, the comonomer can comprise an α-olefin, while in another embodiment, the comonomer can comprise 1-butene, 1-pentene, 1-hexene, 1-octene, 1-decene, styrene, or any combination thereof.

Generally, the amount of comonomer introduced into a polymerization reactor to produce the copolymer can be from about 0.01 to about 50 weight percent of the comonomer based on the total weight of the monomer and comonomer. According to another embodiment, the amount of comonomer introduced into a polymerization reactor can be from about 0.01 to about 40 weight percent comonomer based on the total weight of the monomer and comonomer. In still another embodiment, the amount of comonomer introduced into a polymerization reactor can be from about 0.1 to about 35 weight percent comonomer based on the total weight of the monomer and comonomer. Yet, in another embodiment, the amount of comonomer introduced into a polymerization reactor can be from about 0.5 to about 20 weight percent comonomer based on the total weight of the monomer and comonomer.

While not intending to be bound by this theory, where branched, substituted, or functionalized olefins are used as reactants, it is believed that a steric hindrance can impede and/or slow the polymerization reaction. Thus, branched and/or cyclic portion(s) of the olefin removed somewhat from the carbon-carbon double bond would not be expected to hinder the reaction in the way that the same olefin substituents situated more proximate to the carbon-carbon double bond might.

According to one embodiment, at least one monomer/reactant can be ethylene, so the polymerization reaction can be a homopolymerization involving only ethylene, or a copolymerization with a different acyclic, cyclic, terminal, internal, linear, branched, substituted, or unsubstituted olefin. In addition, the methods disclosed herein intend for olefin to also encompass diolefin compounds that include, but are not limited to, 1,3-butadiene, isoprene, 1,4-pentadiene, 1,5-hexadiene, and the like.

Olefin polymers encompassed herein can include any polymer (or oligomer) produced from any olefin monomer (and optional comonomer(s)) described herein. For example, the olefin polymer can comprise an ethylene homopolymer, a propylene homopolymer, an ethylene copolymer (e.g., ethylene/1-butene, ethylene/1-hexene, ethylene/1-octene, etc.), a propylene copolymer, an ethylene terpolymer, a propylene terpolymer, and the like, including combinations thereof.

Polymerization Reactor Systems

The disclosed methods are intended for any olefin polymerization process using various types of polymerization reactors, polymerization reactor systems, and polymerization reaction conditions. As used herein, "polymerization reactor" includes any polymerization reactor capable of polymerizing (inclusive of oligomerizing) olefin monomers and comonomers (one or more than one comonomer) to produce homopolymers, copolymers, terpolymers, and the like. The various types of polymerization reactors include those that can be referred to as a batch reactor, slurry reactor, gas-phase reactor, solution reactor, high pressure reactor, tubular reactor, autoclave reactor, and the like, or combinations thereof. The polymerization conditions for the various reactor types are well known to those of skill in the art. Gas phase reactors can comprise fluidized bed reactors or staged horizontal reactors. Slurry reactors can comprise vertical or horizontal loops. High pressure reactors can comprise autoclave or tubular reactors. Reactor types can include batch or continuous processes. Continuous processes could use intermittent or continuous product discharge. Polymerization reactor systems and processes also can include partial or full direct recycle of unreacted monomer, unreacted comonomer, and/or diluent.

A polymerization reactor system can comprise one type of reactor or multiple reactors of the same or different type. For instance, the polymerization reactor system can comprise a slurry reactor, a gas-phase reactor, a solution reactor, or a combination of two or more of these reactors. Production of polymers in multiple reactors can include several stages in at least two separate polymerization reactors interconnected by a transfer device making it possible to transfer the polymers resulting from the first polymerization reactor into the second reactor. The desired polymerization conditions in one of the reactors can be different from the operating conditions of the other reactor(s). Alternatively, polymerization in multiple reactors can include the manual transfer of polymer from one reactor to subsequent reactors for continued polymerization. Multiple reactor systems can include any combination including, but not limited to, multiple loop reactors, multiple gas phase reactors, a combination of loop and gas phase reactors, multiple high pressure reactors, or a combination of high pressure with loop and/or gas phase reactors. The multiple reactors can be operated in series, in parallel, or both.

According to one embodiment, the polymerization reactor system can comprise at least one loop slurry reactor comprising vertical or horizontal loops. Monomer, diluent, catalyst, and comonomer can be continuously fed to a loop reactor where polymerization occurs. Generally, continuous processes can comprise the continuous introduction of monomer/comonomer, a catalyst, and a diluent into a polymerization reactor and the continuous removal from this reactor of a suspension comprising polymer particles and the diluent. Reactor effluent can be flashed to remove the solid polymer from the liquids that comprise the diluent, monomer and/or comonomer. Various technologies can be used for this separation step including, but not limited to, flashing that can include any combination of heat addition and pressure reduction; separation by cyclonic action in either a cyclone or hydrocyclone; or separation by centrifugation.

A typical slurry polymerization process (also known as the particle form process) is disclosed, for example, in U.S. Pat. Nos. 3,248,179, 4,501,885, 5,565,175, 5,575,979, 6,239,235, 6,262,191, and 6,833,415, each of which is incorporated herein by reference in its entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is polymerization of propylene monomer as disclosed in U.S. Pat. No. 5,455,314, which is incorporated by reference herein in its entirety.

According to yet another embodiment, the polymerization reactor system can comprise at least one gas phase reactor (e.g., a fluidized bed reactor). Such reactor systems can employ a continuous recycle stream containing one or more monomers continuously cycled through a fluidized bed in the presence of the catalyst under polymerization conditions. A recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 5,352,749, 4,588,790, and 5,436,304, each of which is incorporated by reference in its entirety herein.

According to still another embodiment, the polymerization reactor system can comprise a high pressure polymerization reactor, e.g., can comprise a tubular reactor or an autoclave reactor. Tubular reactors can have several zones where fresh monomer, initiators, or catalysts are added. Monomer can be entrained in an inert gaseous stream and introduced at one zone of the reactor. Initiators, catalysts, and/or catalyst components can be entrained in a gaseous stream and introduced at another zone of the reactor. The gas streams can be intermixed for polymerization. Heat and pressure can be employed appropriately to obtain optimal polymerization reaction conditions.

According to yet another embodiment, the polymerization reactor system can comprise a solution polymerization reactor wherein the monomer/comonomer are contacted with the catalyst composition by suitable stirring or other means. A carrier comprising an inert organic diluent or excess monomer can be employed. If desired, the monomer/comonomer can be brought in the vapor phase into contact with the catalytic reaction product, in the presence or absence of liquid material. The polymerization zone can be maintained at temperatures and pressures that will result in the formation of a solution of the polymer in a reaction medium. Agitation can be employed to obtain better temperature control and to maintain uniform polymerization mixtures throughout the polymerization zone. Adequate means are utilized for dissipating the exothermic heat of polymerization.

The polymerization reactor system can further comprise any combination of at least one raw material feed system, at least one feed system for catalyst or catalyst components, and/or at least one polymer recovery system. Suitable reactor systems can further comprise systems for feedstock purification, catalyst storage and preparation, extrusion, reactor cooling, polymer recovery, fractionation, recycle, storage, loadout, laboratory analysis, and process control. Depending upon the desired properties of the olefin polymer, hydrogen can be added to the polymerization reactor as needed (e.g., continuously, pulsed, etc.).

Polymerization conditions that are controlled for efficiency and to provide desired polymer properties can include temperature, pressure, and the concentrations of various reactants. Polymerization temperature can affect catalyst productivity, polymer molecular weight, and molecular weight distribution. A suitable polymerization temperature can be any temperature below the de-polymerization temperature according to the Gibbs Free energy equation. Typically, this includes from about 60° C. to about 280° C., for example, or from about 60° C. to about 110° C., depending upon the type of polymerization reactor. In some reactor systems, the polymerization temperature generally can be within a range from about 70° C. to about 90° C. or from about 75° C. to about 85° C.

Suitable pressures will also vary according to the reactor and polymerization type. The pressure for liquid phase polymerizations in a loop reactor typically can be less than 1000 psig. The pressure for gas phase polymerization can be in the 200 to 500 psig range. High pressure polymerization in tubular or autoclave reactors generally can be conducted at about 20,000 to 75,000 psig. Polymerization reactors also can be operated in a supercritical region occurring at generally higher temperatures and pressures. Operation above the critical point of a pressure/temperature diagram (supercritical phase) can offer advantages.

Compositions Containing a Catalyst Deactivating Agent

In accordance with certain embodiments, compositions containing a catalyst deactivating agent are provided, and such compositions can comprise (or consist essentially of, or consist of) a catalyst deactivating agent and a $C_3$ to $C_{18}$ hydrocarbon solvent. The catalyst deactivating agent can comprise a polyethylene glycol, a polypropylene glycol, a compound having formula (I), a compound having formula (II), etc., as described herein.

The hydrocarbon solvent can comprise an aliphatic hydrocarbon, an aromatic hydrocarbon, or a combination thereof; alternatively, an aliphatic hydrocarbon; or alternatively, an aromatic hydrocarbon. Suitable aliphatic hydrocarbons which can be useful as the hydrocarbon solvent can include $C_3$ to $C_{18}$ aliphatic hydrocarbons; alternatively, $C_4$ to $C_{10}$ aliphatic hydrocarbons; or alternatively, $C_4$ to $C_8$ aliphatic hydrocarbons. The aliphatic hydrocarbons can be cyclic or acyclic and/or can be linear or branched, unless otherwise specified. Non-limiting examples of suitable acyclic aliphatic hydrocarbon solvents that can be utilized singly or in any combination can include propane, iso-butane, n-butane, butane (n-butane or a mixture of linear and branched $C_4$ acyclic aliphatic hydrocarbons), pentane (n-pentane or a mixture of linear and branched $C_5$ acyclic aliphatic hydrocarbons), hexane (n-hexane or mixture of linear and branched $C_6$ acyclic aliphatic hydrocarbons), heptane (n-heptane or mixture of linear and branched $C_7$ acyclic aliphatic hydrocarbons), octane (n-octane or a mixture of linear and branched $C_8$ acyclic aliphatic hydrocarbons), and the like, or combinations thereof; alternatively, iso-butane, n-butane, butane (n-butane or a mixture of linear and branched $C_4$ acyclic aliphatic hydrocarbons), pentane (n-pentane or a mixture of linear and branched $C_5$ acyclic aliphatic hydrocarbons), hexane (n-hexane or mixture of linear and branched $C_6$ acyclic aliphatic hydrocarbons), heptane (n-heptane or mixture of linear and branched $C_7$ acyclic aliphatic hydrocarbons), octane (n-octane or a mixture of linear and branched $C_8$ acyclic aliphatic hydrocarbons), or combinations thereof; alternatively, butane (n-butane or a mixture of linear and branched $C_4$ acyclic aliphatic hydrocarbons), pentane (n-pentane or a mixture of linear and branched $C_5$ acyclic aliphatic hydrocarbons), hexane (n-hexane or mixture of linear and branched $C_6$ acyclic aliphatic hydrocarbons), heptane (n-heptane or mixture of linear and branched $C_7$ acyclic aliphatic hydrocarbons), octane (n-octane or a mixture of linear and branched $C_8$ acyclic aliphatic hydrocarbons), or combinations thereof; alternatively, propane; alternatively, iso-butane; alternatively, n-butane; alternatively, butane (n-butane or a mixture of linear and branched $C_4$ acyclic aliphatic hydrocarbons); alternatively, pentane (n-pentane or a mixture of linear and branched $C_5$ acyclic aliphatic hydrocarbons); alternatively, hexane (n-hexane or mixture of linear and branched $C_6$ acyclic aliphatic hydrocarbons); alternatively, heptane (n-heptane or mixture of linear and branched $C_7$ acyclic aliphatic hydrocarbons); or alternatively, octane (n-octane or a mixture of linear and branched $C_8$ acyclic aliphatic hydrocarbons).

Non-limiting examples of suitable cyclic aliphatic hydrocarbon solvents can include, but are not limited to, cyclopentane, cyclohexane, methyl cyclopentane, methyl cyclohexane, and the like, or combinations thereof; alternatively, cyclopentane; alternatively, cyclohexane; alternatively, methyl cyclopentane; or alternatively, methyl cyclohexane. Aromatic hydrocarbons which can be useful as the hydrocarbon solvent can include $C_6$ to $C_{18}$ aromatic hydrocarbons or, alternatively, $C_6$ to $C_{10}$ aromatic hydrocarbons. Non-limiting examples of suitable aromatic hydrocarbons that can be utilized singly or in any combination can include, but are not limited to, benzene, toluene, xylene (including ortho-xylene, meta-xylene, para-xylene, or mixtures thereof), ethylbenzene, and the like, or combinations thereof; alternatively, benzene; alternatively, toluene; alternatively, xylene (including ortho-xylene, meta-xylene, para-xylene or mixtures thereof); or alternatively, ethylbenzene.

In one embodiment, the hydrocarbon solvent can comprise (or consist essentially of, or consist of) propane, isobutane, n-butane, n-pentane, isopentane, neopentane, n-hexane, n-heptane, n-octane, cyclopentane, cyclohexane, cycloheptane, methylcyclopentane, methylcyclohexane, methylcycloheptane, benzene, toluene, xylene, ethylbenzene, or a mixture thereof. In another embodiment, the hydrocarbon solvent can comprise propane, isobutane, n-butane, n-pentane, isopentane, neopentane, n-hexane, heptane, octane, cyclohexane, cycloheptane, methylcyclohexane, methylcycloheptane, benzene, toluene, xylene, ethylbenzene, or a mixture thereof. Yet, in another embodiment, the hydrocarbon solvent can comprise propane; alternatively, isobutane; alternatively, n-butane; alternatively, n-pentane; alternatively, isopentane; alternatively, neopentane; alternatively, n-hexane; alternatively, heptane; alternatively, octane; alternatively, cyclohexane; alternatively, cycloheptane; alternatively, methylcyclohexane; alternatively, methylcycloheptane; alternatively, benzene; alternatively, toluene; alternatively, xylene; or alternatively, ethylbenzene.

Compositions can comprise a catalyst deactivating agent (e.g., having formula (I)) and a $C_3$ to $C_{18}$ hydrocarbon solvent. Consistent with embodiments disclosed herein, the weight ratio of the hydrocarbon solvent to the catalyst deactivating agent in the composition can be in a range from about 100:1 to about 1:100, such as, for example, from about 75:1 to about 1:75, from about 50:1 to about 1:50, from about 25:1 to about 1:25, from about 10:1 to about 1:10, or from about 5:1 to about 1:5.

EXAMPLES

The invention is further illustrated by the following examples, which are not to be construed in any way as imposing limitations to the scope of this invention. Various other aspects, embodiments, modifications, and equivalents thereof which, after reading the description herein, can suggest themselves to one of ordinary skill in the art without departing from the spirit of the present invention or the scope of the appended claims.

The catalyst deactivating agents used in Examples 1-28 had the following structures and corresponding abbreviations:

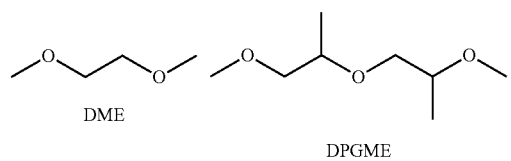

Examples 1-17

Addition of a Catalyst Deactivating Agent into a Polymerization Reaction Using a Chromium-Based Catalyst System The chromium-based catalyst systems used in Examples 1-17 were Magnapore 963 and 969 MPI, commercially available from W.R. Grace.

Polymerization runs were conducted in a 2.2-L steel reactor equipped with a marine stirrer rotating at 500 rpm. The reactor was equipped with a temperature jacket and control system to maintain substantially constant temperature (+/−0.5° C.). Unless otherwise stated, a small amount (0.01 to 0.10 g. typically) of the solid catalyst was first charged under nitrogen to the dry reactor. Next, 1 L of isobutane liquid was charged, and the reactor heated up to 105° C. When co-catalysts were used, such as triethylaluminum (TEA), 1 mL of a 0.5 wt. % co-catalyst solution was added midway during the isobutane addition. Finally, ethylene was added to the reactor to a pressure of about 550 psig, which was maintained throughout the polymerization run, typically 30 min to 1 hr. The reaction rate was determined by recording the flow of ethylene into the reactor required to maintain the fixed reactor pressure.

In Examples 1-17, the catalyst deactivating agent (CDA) was injected into the reactor midway through the run as follows. First, the reactor was closed so that the ethylene feed was stopped. Then, the pressure was decreased by bleeding off enough gas to lower the pressure to about 250 psig. Next, a solution of the CDA in n-heptane was injected into an entry port which was simultaneously purged with isobutane vapor, then closed and re-filled with isobutane liquid. The port was re-pressurized with ethylene to 300 psig. The pressurized port was then opened to the reactor, so that the CDA was immediately flushed with about 125 mL of isobutane into the reactor, followed by resuming ethylene addition to 550 psig. The effect of the CDA was immediately noticed by a drop in heat produced (as monitored by the difference in temperature between the jacket temperature and the reactor temperature). It usually took a few minutes to equalize the pressure between the reactor and the entry port, so the ethylene flow continued for a few minutes. Hence, the configuration of the reactor, and the method of injecting the CDA into the reactor, led to inflated time periods for the reduction in polymerization rate. However, Applicants believe that once the CDA was in contact with the catalyst, the "kill" or termination of reaction was extremely rapid, i.e., substantially instantaneous.

Table I summarizes certain process conditions and materials for Examples 1-17. The temperature listed was the activation temperature for the catalyst system. The ratio of the catalyst deactivating agent (abbreviated CDA) to the chromium catalyst was a molar ratio based on the moles of CDA and the moles of chromium. In Table I, the time of addition was described as "late" if the catalyst deactivating agent was injected after the polymer production rate had approached equilibrium. The time of addition was described as "early" if the catalyst deactivating agent was injected soon after the appearance of catalyst activity. The % reduction in rate was the percent reduction in rate as a result of the addition of the catalyst deactivating agent to the polymerization reactor, the basis being the production rate prior to the introduction of the catalyst deactivating agent. In Examples 1-2, the polymerization reaction was noted as being "restarted" after the introduction of the CDA. In these examples, all of the catalyst was not killed, so even though the immediate kill percentage was high, the "active" catalyst continued to react, polymerize, and develop activity as it normally does, even after the CDA was added. In Examples 11-12, triethylaluminum (TEA) was used in the catalyst system, and was present at a CDA/TEA molar ratio of 0.026 and 0.033, respectively.

FIGS. 1-4 graphically illustrate Examples 1-3 and 6, respectively. The reaction rate listed, abbreviated g/g-h, was the grams of polyethylene produced per gram of the chromium catalyst system per hour. FIGS. 1-4 and Table I demonstrate that the disclosed catalyst deactivating agents can be very effective at reducing the catalyst activity and/or the reaction rate, as well as completely terminating a polymerization reaction. Additionally, very low amounts of the catalyst deactivating agent, based on the amount of the transition metal, were required.

use by purging with nitrogen and heating the empty reactor to 110° C. After cooling to below 40° C. and purging with isobutane vapor, 1 mL of 15 weight % TEA (triethylaluminum) in heptane, about 10 mg of catalyst (obtained from W.R. Grace under the product designation 5951) or a slurry of the catalyst, and 1.25 L of isobutane were added. The contents were mixed at 700 rpm and heated to near the target polymerization temperature of 105° C., and maintained at that temperature for the duration of the run. Ethylene was then added and fed on demand to maintain the total pressure at 300 psig.

In Examples 18-22, the CDA was injected into the reactor midway through the run as follows. First, the reactor was closed so that the ethylene feed was stopped. Then, the pressure was decreased by bleeding off enough gas to lower the pressure to about 250 psig. Next, a solution of the CDA in n-heptane was injected into an entry port which was simultaneously purged with isobutane vapor, then closed and re-filled with isobutane liquid. The port was re-pressurized with ethylene to 300 psig. The pressurized port was then opened to the reactor, so that the CDA was immediately flushed with about 125 mL of isobutane into the reactor, followed by resuming ethylene addition to 300 psig. The effect of the CDA was immediately noticed by the drop in heat produced (as monitored by the difference in temperature between the jacket temperature and the reactor temperature). It usually took a few minutes to equalize the pressure between the reactor and the entry port, so the ethylene flow continued for a few minutes. As with Examples 1-17, the configuration of the reactor, and the method of injecting the CDA into the reactor, led to an inflated time period for the reduction in polymerization rate in Examples 18-22. However, Applicants believe that once the CDA was in contact with the catalyst, the "kill" or termination of reaction was extremely rapid, i.e., substantially instantaneous.

TABLE I

Addition of Catalyst Deactivating Agent to Chromium-Catalyzed Polymerization—Examples 1-17

| Example | Catalyst System | Temp. (° C.) | CDA | CDA/Cr molar ratio | Time of Addition | % Reduction in Rate | Restarted after CDA |
|---|---|---|---|---|---|---|---|
| 1 | 963 Magnapore | 825 | DPGME | 0.035 | Late | 57 | Yes |
| 2 | 963 Magnapore | 825 | DPGME | 0.10 | Late | 70 | Yes |
| 3 | 963 Magnapore | 825 | DPGME | 0.20 | Late | 80 | No |
| 4 | 963 Magnapore | 825 | DPGME | 0.38 | Late | 100 | No |
| 5 | 963 Magnapore | 825 | DPGME | 0.40 | Early | 100 | No |
| 6 | 963 Magnapore | 825 | DPGME | 0.81 | Late | 100 | No |
| 7 | 963 Magnapore | 825 | DPGME | 0.82 | Early | 100 | No |
| 8 | 963 Magnapore | 825 | DPGME | 1.40 | Late | 100 | No |
| 9 | 963 Magnapore | 825 | DPGME | 1.60 | Early | 100 | No |
| 10 | 963 Magnapore | 825 | DPGME | 1.60 | Late | 100 | No |
| 11 | 963 Magnapore | 825 | DPGME | 1.20 | Late | 100 | No |
| 12 | 963 Magnapore | 825 | DPGME | 1.60 | Late | 100 | No |
| 13 | 969 MPI | 825 | DPGME | 0.40 | Late | 100 | No |
| 14 | 969 MPI | 825 | DPGME | 1.42 | Late | 100 | No |
| 15 | 963 Magnapore | 825 | DME | 0.76 | Late | 100 | No |
| 16 | 963 Magnapore | 825 | DME | 1.60 | Late | 100 | No |
| 17 | 963 Magnapore | 825 | DME | 1.40 | Late | 100 | No |

Examples 18-22

Figure 5:
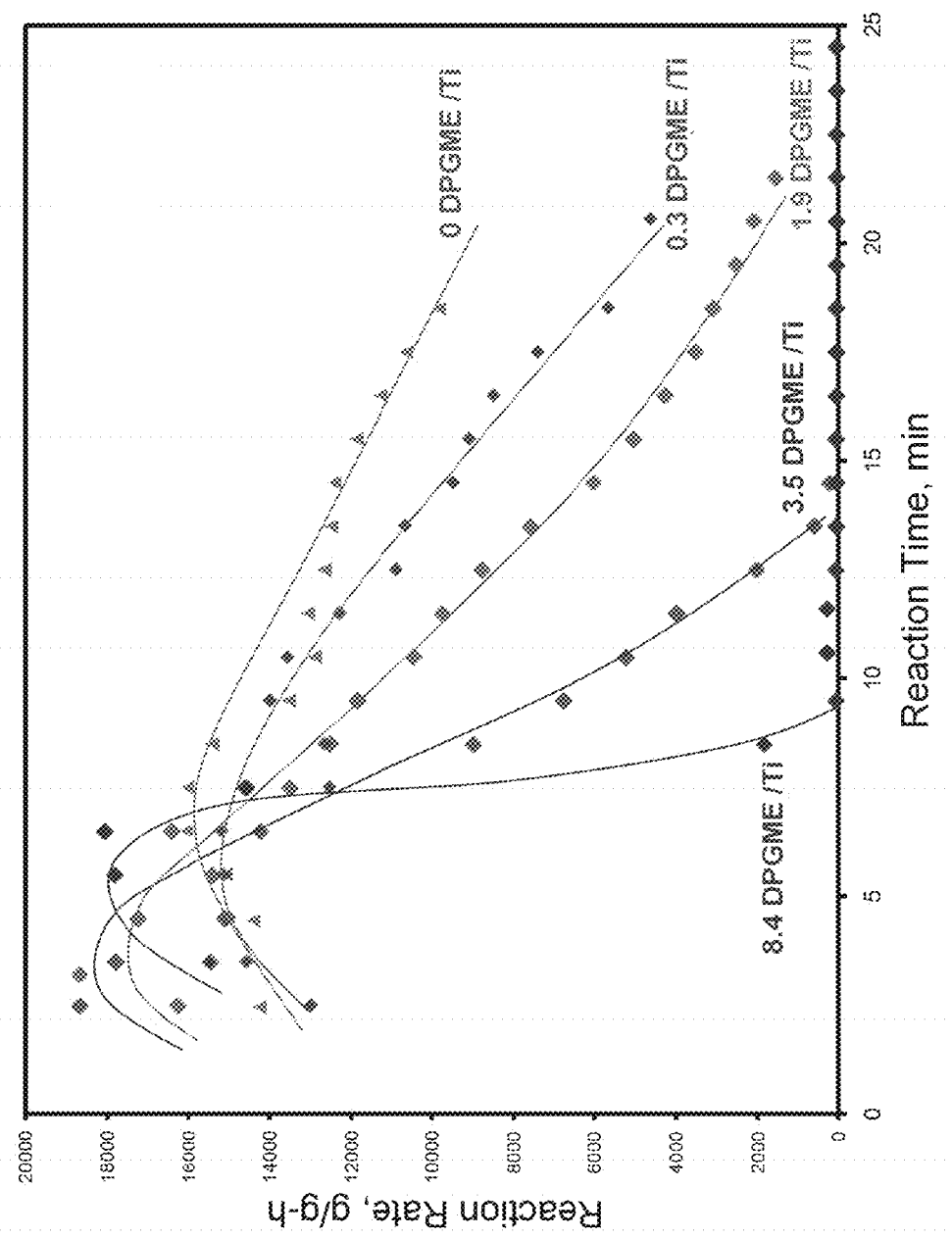
FIG. 5 presents a plot of the reaction rates versus the reaction times for Examples 18-22 at DPGME/Ti molar ratios up to 8.4:1.
Figure 6:
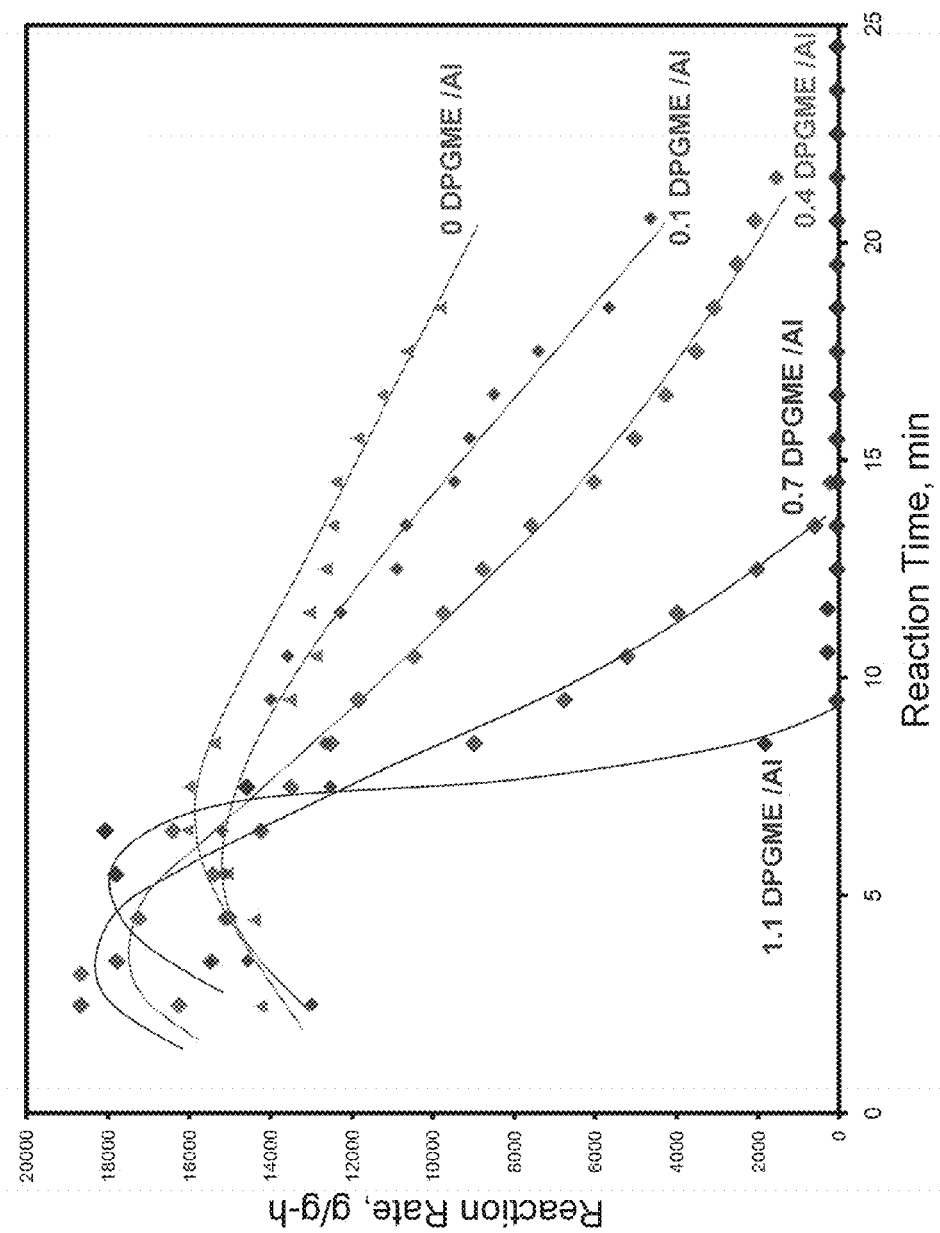
FIG. 6 presents the data of FIG. 5, but the molar ratios listed are based on the moles of Al in the alkylaluminum component of the catalyst system, instead of on the moles of Ti.

Addition of a Catalyst Deactivating Agent into a Polymerization Reaction Using a Ziegler-Natta Catalyst System All polymerizations were conducted in a 2.2-L reactor as described in Examples 1-17. The reactor was prepared for FIG. 5 illustrates the reaction rates versus the reaction times for Example 18-22, and lists the molar ratios of 0, 0.3, 1.9, 3.5, and 8.4, respectively, based on the moles of catalyst deactivating agent per mole of Ti in the catalyst system. FIG. 6 illustrates the data of FIG. 5, but the molar ratios listed are based on the moles of Al in the alkylaluminum component of the catalyst system. The amount of alkylaluminum varied in Examples 18-22. The reaction rate listed, abbreviated g/g-h, was the grams of polyethylene produced per gram of the Ziegler-Natta catalyst system per hour. FIGS. 5-6 demonstrate that the disclosed catalyst deactivating agents can be very effective at reducing the catalyst activity and/or the reaction rate, including completely terminating a polymerization reaction, even at very low addition levels.

Examples 23-28

Addition of a Catalyst Deactivating Agent into a Polymerization Reaction Using a Metallocene-Based Catalyst System Examples 23-28 were conducted in a one-gallon (3.785-L) stainless steel reactor. Metallocene solutions (1 mg/mL) were usually prepared by dissolving 30 mg of the metallocene in 30 mL of toluene. CDA solutions were prepared by dissolving 1 mL of the CDA in 100 mL of heptanes. A typical experimental procedure was as follows. Alkyl aluminum solution (0.5 mmol triisobutylaluminum), sulfated alumina (150 mg), and the metallocene solution (2 mg metallocene, 0.0034 mmol) were added in that order through a charge port while venting isobutane vapor. The aluminum to transition metal (Zr) ratio was approximately 146:1. The charge port was closed and about 1.8 L of isobutane were added. The contents of the reactor were stirred and heated to the desired run temperature of 90° C., which was maintained constant via an automated heating-cooling system. Ethylene was continuously fed with an automated feeding system on demand to maintain the 390 psig pressure for the duration of the polymerization run. After the polymerization reaction was established, the solution of the CDA was introduced into the reactor with high pressure ethylene injection. The metallocene compound used in Examples 23-28 had the following structure:

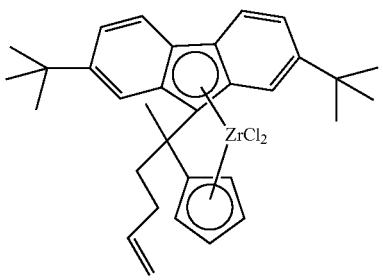

Table II summarizes certain process conditions and materials for Examples 23-28. The ratios of the catalyst deactivating agent (abbreviated CDA) to the aluminum (in the alkyl aluminum) and zirconium (in the metallocene compound) are molar ratios.

Figure 7:
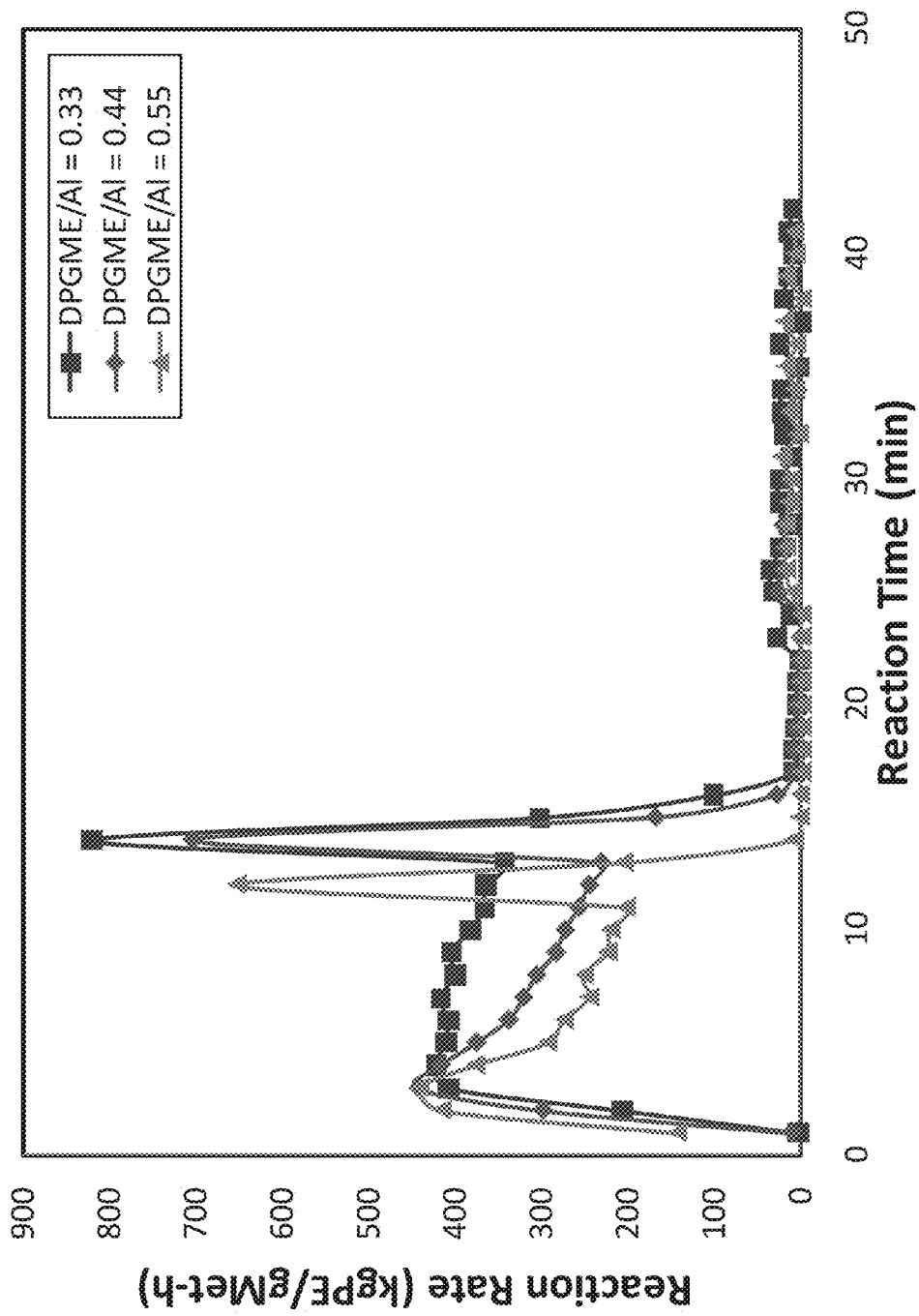
FIG. 7 presents a plot of the reaction rates versus the reaction times for Example 23-25 at DPGME/Al molar ratios in a range from 0.33:1 to 0.55:1.
Figure 8:
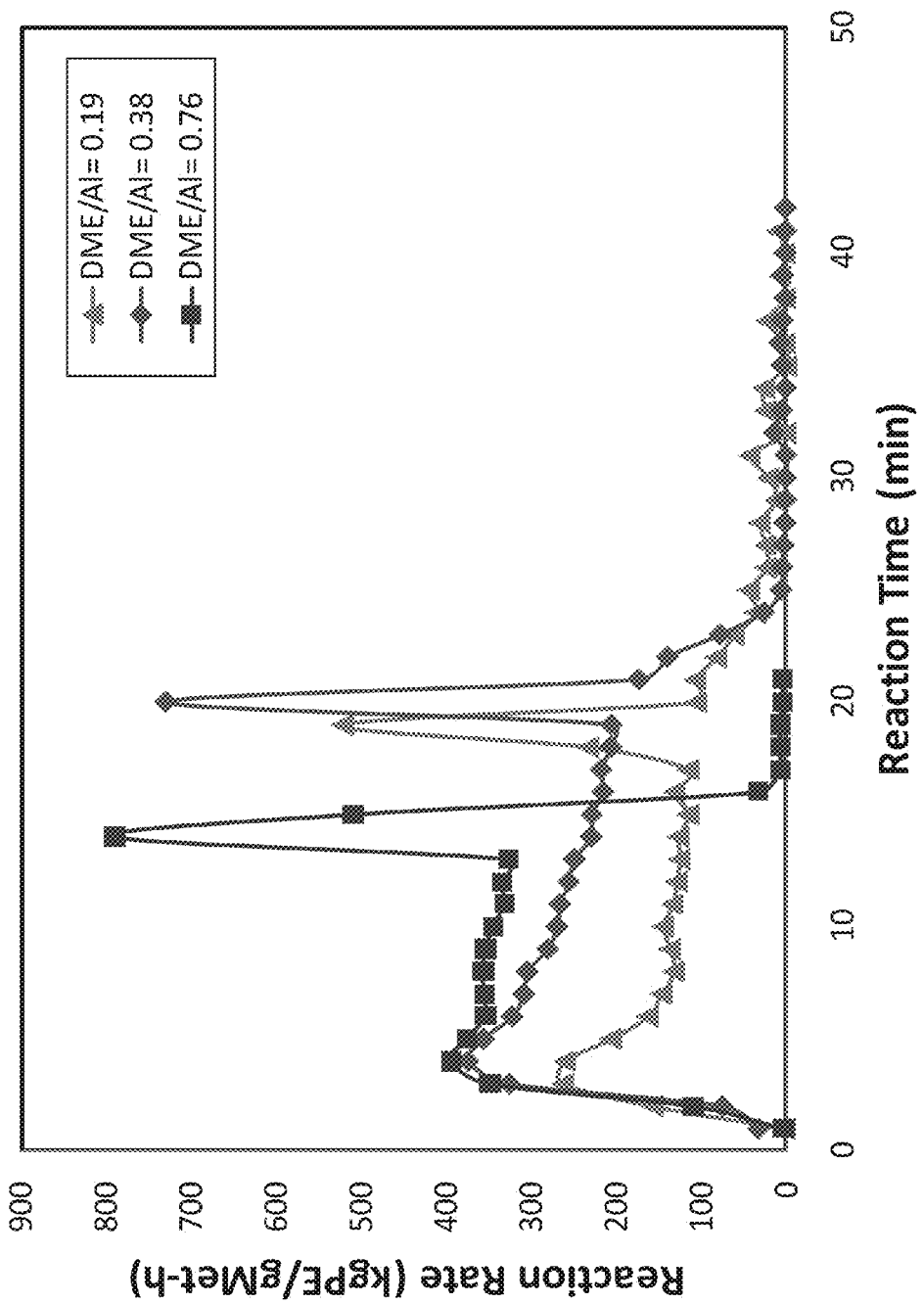
FIG. 8 presents a plot of the reaction rates versus the reaction times for Example 26-28 at DME/Al molar ratios in a range from 0.19:1 to 0.76:1.

FIGS. 7-8 illustrate the reaction rates versus the reaction times for Examples 23-25 and 26-28, respectively. Examples 23-25 were conducted at DPGME/TM molar ratios of 48:1, 64:1, and 80:1, respectively. Examples 26-28 were conducted at DME/TM molar ratio of 28:1, 56:1, and 111:1, respectively. The molar ratios were based on moles of catalyst deactivating agent per mole of the transition metal in the metallocene component of the catalyst system. The reaction rate listed, abbreviated kgPE/gMet-h, was the kilograms of polyethylene produced per gram of the metallocene component of the catalyst system per hour. FIGS. 7-8 show a spike in the reaction rate at the time of injection; this was due the injection of the catalyst deactivating agent along with a high pressure injection of ethylene gas, which caused a brief increase in reaction rate. FIGS. 7-8 demonstrate that the disclosed catalyst deactivating agents can be very effective at reducing the catalyst activity and/or the reaction rate, including completely terminating a polymerization reaction, even at very low addition levels. The CDA ratios based on the amount of metallocene were much higher than the corresponding ratios based on the alkylaluminum (molar ratio of less than 1:1 for CDA:Al), due to the relatively small amount of metallocene compound present in the polymerization reactor.

TABLE II

Addition of Catalyst Deactivating Agent to Metallocene-Catalyzed Polymerization—Examples 23-28

| Example | Time (min) | CDA | CDA (mg) | CDA (mmol) | CDA/Al molar ratio | CDA/Zr molar ratio |
|---|---|---|---|---|---|---|
| 23 | 45 | DPGME | 26.8 | 0.17 | 0.33 | 48 |
| 24 | 45 | DPGME | 35.7 | 0.22 | 0.44 | 64 |
| 25 | 45 | DPGME | 44.7 | 0.28 | 0.55 | 81 |
| 26 | 45 | DME | 8.6 | 0.10 | 0.19 | 28 |
| 27 | 45 | DME | 17.2 | 0.19 | 0.38 | 56 |
| 28 | 30 | DME | 34.3 | 0.38 | 0.76 | 111 |

The invention has been described above with reference to numerous embodiments and specific examples. Many variations will suggest themselves to those skilled in the art in light of the above detailed description. All such obvious variations are within the full intended scope of the appended claims. Other embodiments of the invention can include, but are not limited to, the following:

Embodiment 1

A method of controlling a polymerization reaction in a polymerization reactor system, the method comprising:
(i) introducing a transition metal-based catalyst system, an olefin monomer, and optionally an olefin comonomer into a polymerization reactor within the polymerization reactor system;
(ii) contacting the transition metal-based catalyst system with the olefin monomer and the optional olefin comonomer under polymerization conditions to produce an olefin polymer, and
(iii) introducing a catalyst deactivating agent into the polymerization reactor system to partially or completely terminate the polymerization reaction in the polymerization reactor system;
wherein the catalyst deactivating agent comprises a polyethylene glycol, a polypropylene glycol, a compound having formula (I), or a combination thereof, wherein formula (I) is:

$$R^1-X^1-R^3-X^2-R^2 \qquad \text{(I);}$$

wherein:

$X^1$ and $X^2$ independently are O, S, or NR, wherein R is hydrogen or a $C_1$ to $C_{18}$ hydrocarbyl group;

$R^1$ and $R^2$ independently are hydrogen or a $C_1$ to $C_{18}$ hydrocarbyl group; and $R^3$ comprises up to 18 carbon atoms and is
- (i) a substituted or unsubstituted chain of at least two contiguous carbons atoms, one end of which is bonded to $X^1$ and the other end of which is bonded to $X^2$, or
- (ii) a substituted or unsubstituted ether, thioether, or amine group having at least four carbon atoms, a two-carbon atom end of which is bonded to $X^1$ and the other two-carbon atom end of which is bonded to $X^2$.

Embodiment 2

The method defined in embodiment 1, wherein the catalyst deactivating agent is introduced into the polymerization reactor to partially or completely terminate the polymerization reaction in the polymerization reactor.

Embodiment 3

The method defined in embodiment 1, wherein the catalyst deactivating agent is introduced into the polymerization reactor system downstream of the polymerization reactor to completely terminate the polymerization reaction.

Embodiment 4

The method defined in embodiment 1, wherein a process variable is monitored to detect an undesired condition in the polymerization reactor system, and when the undesired reaction condition has reached a predetermined critical level, the catalyst deactivating agent is introduced into the polymerization reactor.

Embodiment 5

The method defined in any one of the preceding embodiments, the method further comprising:

a step of discontinuing the introducing of the transition metal-based catalyst system into the polymerization reactor before, during, or after the step of introducing the catalyst deactivating agent into the polymerization reactor or polymerization reactor system;

a step of discontinuing the introducing of the olefin monomer into the polymerization reactor before, during, or after the step of introducing the catalyst deactivating agent into the polymerization reactor or polymerization reactor system; or both.

Embodiment 6

The method defined in embodiment 1, wherein:

Step (i) comprises:
- (A) introducing a first transition metal-based catalyst system, a first olefin monomer, and optionally a first olefin comonomer into a polymerization reactor in the polymerization reactor system;

Step (ii) comprises:
- (B) contacting the first transition metal-based catalyst system with the first olefin monomer and the optional first olefin comonomer under polymerization conditions to produce a first olefin polymer, the method further comprising:
- (C) discontinuing the introducing of the first transition metal-based catalyst system into the polymerization reactor before, during, or after step (iii) of introducing the catalyst deactivating agent into the polymerization reactor; and
- (D) introducing a second transition metal-based catalyst system into the polymerization reactor and contacting the second transition metal-based catalyst system with a second olefin monomer and optionally a second olefin comonomer under polymerization conditions to produce a second olefin polymer.

Embodiment 7

The method defined in any one of the preceding embodiments, wherein the transition metal-based catalyst system comprises chromium, vanadium, titanium, zirconium, hafnium, or a combination thereof.

Embodiment 8

The method defined in any one of the preceding embodiments, wherein the transition metal-based catalyst system is a chromium-based catalyst system, a Ziegler-Natta based catalyst system, a metallocene-based catalyst system, or a combination thereof.

Embodiment 9

The method defined in any one of the preceding embodiments, wherein the olefin monomer is a $C_2$-$C_{20}$ olefin.

Embodiment 10

The method defined in any one of the preceding embodiments, wherein the olefin monomer is ethylene and the olefin comonomer comprises propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-ethyl-1-hexene, 1-heptene, 2-heptene, 3-heptene, 1-octene, 1-decene, styrene, or a mixture thereof.

Embodiment 11

The method defined in any one of the preceding embodiments, wherein the polymerization reactor system comprises a slurry reactor, a gas-phase reactor, a solution reactor, or a combination thereof.

Embodiment 12

The method defined in any one of the preceding embodiments, wherein the catalyst deactivating agent is introduced into the polymerization reactor or polymerization reactor system at a molar ratio of the catalyst deactivating agent to the transition metal in the transition metal-based catalyst system in a range from 0.001:1 to 1000:1.

Embodiment 13

The method defined in any one of the preceding embodiments, wherein the step of introducing the catalyst deactivating agent into the polymerization reactor or polymerization reactor system reduces the catalyst activity of the transition metal-catalyst system by at least 50%, reduces the production rate of the olefin polymer by at least 50%, or both.

Embodiment 14

The method defined in any one of the preceding embodiments, wherein the step of introducing the catalyst deactivating agent into the polymerization reactor or polymerization reactor system reduces the catalyst activity of the transition metal-catalyst system by at least 95% in a time period of less than 1 minute, reduces the production rate of the olefin polymer by at least 95% in a time period of less than 1 minute, or both.

Embodiment 15

The method defined in any one of the preceding embodiments, wherein the catalyst deactivating agent comprises a polyethylene glycol, a polypropylene glycol, or a combination thereof.

Embodiment 16

A composition comprising:
a hydrocarbon solvent having from 3 to 18 carbon atoms; and
a catalyst deactivating agent comprising a compound having formula (I):

$$R^1-X^1-R^3-X^2-R^2 \quad (I);$$

wherein:
$X^1$ and $X^2$ independently are O, S, or NR, wherein R is hydrogen or a $C_1$ to $C_{18}$ hydrocarbyl group;
$R^1$ and $R^2$ independently are hydrogen or a $C_1$ to $C_{18}$ hydrocarbyl group; and
$R^3$ comprises up to 18 carbon atoms and is
  (i) a substituted or unsubstituted chain of at least two contiguous carbons atoms, one end of which is bonded to $X^1$ and the other end of which is bonded to $X^2$, or
  (ii) a substituted or unsubstituted ether, thioether, or amine group having at least four carbon atoms, a two-carbon atom end of which is bonded to $X^1$ and the other two-carbon atom end of which is bonded to $X^2$.

Embodiment 17

The method defined in any one of embodiments 1-15 and the composition defined in embodiment 16, wherein the catalyst deactivating agent has a boiling point of at least 70° C., and is miscible with a $C_3$ to $C_{10}$ hydrocarbon solvent.

Embodiment 18

The method defined in any one of embodiments 1-15 and the composition defined in embodiment 16, wherein the catalyst deactivating agent has a boiling point of at least 80° C., and is miscible with propane, cyclohexane, isobutane, n-butane, n-pentane, isopentane, neopentane, n-hexane, benzene, or a mixture thereof.

Embodiment 19

The method defined in any one of embodiments 1-14 and the composition defined in embodiment 16, wherein the catalyst deactivating agent comprises:

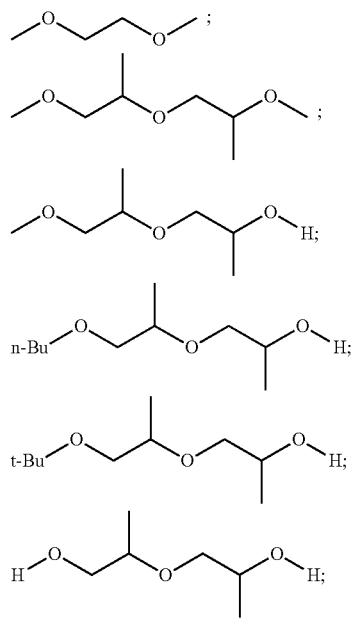

a combination thereof.

Embodiment 20

The method defined in any one of embodiments 1-14 and the composition defined in embodiment 16, wherein the catalyst deactivating agent comprises the compound having formula (I), and wherein $X^1$ and $X^2$ independently are O or S; $R^1$ and $R^2$ independently are hydrogen, a $C_1$ to $C_{12}$ alkyl group, or a $C_2$ to $C_{12}$ alkenyl group; and $R^3$ is a $C_2$-$C_8$ linear or branched alkanediyl, or a substituted or unsubstituted ether, thioether, or amine group having from 4 to 12 carbon atoms.

Embodiment 21

The method defined in any one of embodiments 1-14 and the composition defined in embodiment 16, wherein the catalyst deactivating agent comprises a compound having formula (II):

$$R^1-O-R^3-O-R^2 \quad (II);$$

wherein:
$R^1$ and $R^2$ independently are a $C_1$ to $C_{18}$ hydrocarbyl group; and
$R^3$ comprises up to 18 carbon atoms and is
  (i) a substituted or unsubstituted chain of at least two contiguous carbons atoms, one end of which is bonded to $X^1$ and the other end of which is bonded to $X^2$, or
  (ii) a substituted or unsubstituted ether, thioether, or amine group having at least four carbon atoms, a two-carbon atom end of which is bonded to $X^1$ and the other two-carbon atom end of which is bonded to $X^2$.

Embodiment 22

The method and/or composition defined in embodiment 21, wherein $R^1$ and $R^2$ in formula (II) independently are methyl, ethyl, propyl, or butyl.

Embodiment 23

The method and/or composition defined in embodiment 21, wherein $R^3$ in formula (II) is

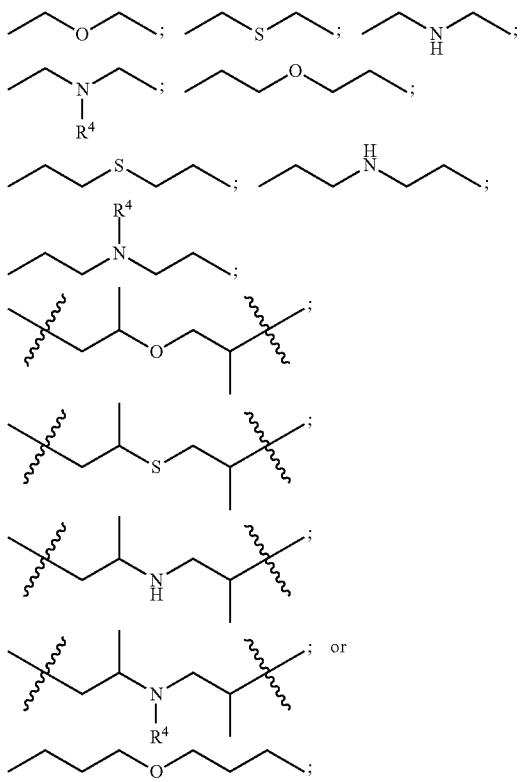

wherein $R^4$ is a $C_1$ to $C_{10}$ hydrocarbyl group.

We claim:
1. A composition consisting of:
   a hydrocarbon solvent having from 3 to 18 carbon atoms; and
   a catalyst deactivating agent comprising a compound having the structure:

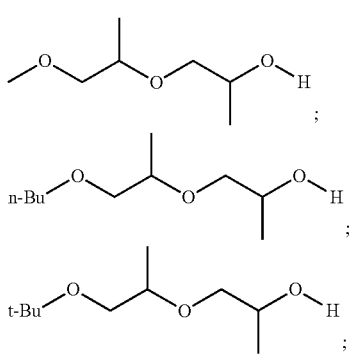

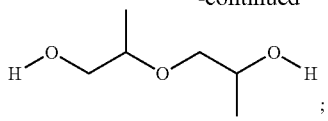

or a combination thereof.

2. The composition of claim 1, wherein the hydrocarbon solvent comprises propane, isobutane, n-butane, n-pentane, isopentane, neopentane, n-hexane, heptane, octane, cyclohexane, cycloheptane, methylcyclohexane, methylcycloheptane, benzene, toluene, xylene, ethylbenzene, or a mixture thereof.

3. The composition of claim 2, wherein a weight ratio of the hydrocarbon solvent to the catalyst deactivating agent is in a range from about 100:1 to about 1:100.

4. The composition of claim 1, wherein the catalyst deactivating agent comprises:

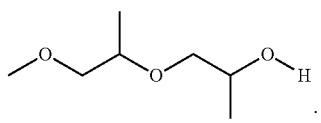

5. The composition of claim 1, wherein the catalyst deactivating agent comprises:

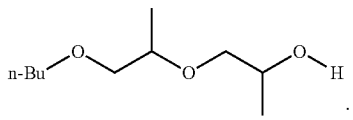

6. The composition of claim 1, wherein the catalyst deactivating agent comprises:

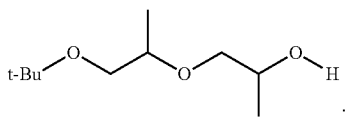

7. The composition of claim 1, wherein the catalyst deactivating agent comprises:

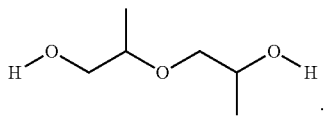

8. The composition of claim 1, wherein the hydrocarbon solvent comprises isobutane.

9. The composition of claim 1, wherein a weight ratio of the hydrocarbon solvent to the catalyst deactivating agent is in a range from about 100:1 to about 1:100.

* * * * *